(12) United States Patent
Hurd et al.

(10) Patent No.: US 10,005,947 B2
(45) Date of Patent: Jun. 26, 2018

(54) MODIFIED HYDROCARBON RESINS AS FLUID LOSS ADDITIVES

(71) Applicant: INGEVITY SOUTH CAROLINA, LLC, North Charleston, SC (US)

(72) Inventors: Phillip W. Hurd, Conyers, GA (US); Nathan P. Rife, Missouri City, TX (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 329 days.

(21) Appl. No.: 14/546,310

(22) Filed: Nov. 18, 2014

(65) Prior Publication Data

US 2015/0136402 A1 May 21, 2015

Related U.S. Application Data

(60) Provisional application No. 61/906,088, filed on Nov. 19, 2013.

(51) Int. Cl.
    *C09K 8/32* (2006.01)
    *C09K 8/502* (2006.01)
    *E21B 21/06* (2006.01)

(52) U.S. Cl.
    CPC .............. *C09K 8/32* (2013.01); *C09K 8/502* (2013.01); *E21B 21/068* (2013.01)

(58) Field of Classification Search
    CPC ........ C09K 15/22; C09K 15/24; C09K 15/30; C09K 21/12; C09K 15/06; C09K 15/08; C09K 15/12; C09K 15/20; C09K 15/322; C09K 21/04; C09K 21/10; C09K 21/14; C09K 2200/0655; C09K 3/1006; C09K 8/536; C09K 8/32; C09K 8/36; C09K 8/54; C09K 8/64; C09K 2208/12; C09K 8/18; C09K 8/20; C09K 8/24; C09K 8/28; C09K 8/502; C09K 8/5086; C09K 8/512; C09K 8/685; C09K 8/76; C09K 8/92; C09K 3/22; C09K 3/18; C09K 3/185; C09K 2003/1068; C09K 2200/0625; C09K 3/10
    See application file for complete search history.

(56) References Cited

U.S. PATENT DOCUMENTS

| | | |
|---|---|---|
| 3,319,716 A | 5/1967 | Dill |
| 3,357,914 A | 12/1967 | McConnell et al. |
| 3,437,629 A | 4/1969 | Bramer et al. |
| 3,467,615 A | 9/1969 | McConnell et al. |
| 3,701,760 A | 10/1972 | Hagemeyer, Jr. et al. |
| 4,056,498 A * | 11/1977 | Laurito ................. C08F 232/08 525/285 |
| 4,189,410 A | 2/1980 | Laurito |
| 4,242,244 A | 12/1980 | Malatesta |
| 4,292,221 A | 9/1981 | Malatesta |
| 4,433,100 A | 2/1984 | Laurito |
| 4,574,057 A | 3/1986 | Kaza et al. |
| 4,670,515 A * | 6/1987 | Olivier ..................... C08L 51/06 525/285 |
| 4,671,883 A | 6/1987 | Connell et al. |
| 4,927,669 A | 5/1990 | Knox et al. |
| H000935 H * | 7/1991 | Rines ....................... C09K 8/36 507/103 |
| 6,169,134 B1 * | 1/2001 | Jones ....................... C09K 8/32 507/118 |
| 6,803,347 B1 | 10/2004 | Ladva et al. |
| 8,133,970 B2 | 3/2012 | Hurd et al. |
| 8,334,363 B2 | 12/2012 | Hurd et al. |
| 2010/0326660 A1 * | 12/2010 | Ballard .............. C08G 59/5006 166/300 |
| 2013/0085086 A1 | 4/2013 | Harris et al. |

FOREIGN PATENT DOCUMENTS

| | | |
|---|---|---|
| WO | 93/09201 | 5/1993 |
| WO | 2008/001048 | 1/2008 |

OTHER PUBLICATIONS

SIGMA-ALDRICH Safety Data Sheet downloaded on Jan. 27, 2017.*
http://petrowiki.org/index.php?title=Drilling_fluid_types&printable=yes downloaded on Aug. 8, 2017.*

* cited by examiner

*Primary Examiner* — Kumar R Bhushan
(74) *Attorney, Agent, or Firm* — Bryan D. Zerhusen; Locke Lord LLP

(57) ABSTRACT

Methods for treating oil-based drilling fluids with a fluid loss additive that includes one or more hydrocarbon resins. An oil-based drilling fluid and a hydrocarbon resin can be combined to produce a treated oil-based drilling fluid. The hydrocarbon resin can include a polymerized product of a reaction mixture that can include a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

17 Claims, No Drawings

MODIFIED HYDROCARBON RESINS AS FLUID LOSS ADDITIVES

CROSS-REFERENCE TO RELATED APPLICATION

This application claims priority to U.S. Provisional Patent Application having Ser. No. 61/906,088, filed on Nov. 19, 2013, which is incorporated by reference herein.

BACKGROUND

Field

Embodiments described generally relate to methods for treating oil-based drilling fluids. More particularly, the embodiments described relate to methods for treating oil-based drilling fluids with fluid loss additives that include one or more hydrocarbon resins.

Description of the Related Art

Subterranean deposits of natural resources such as gas, water, and crude oil are commonly recovered by drilling wellbores to tap subterranean formations or zones containing such deposits. Various fluids are employed in drilling the wellbore and preparing the wellbore for the recovery of the natural resources. For example, a drilling fluid can be circulated through a wellbore that can serve a number of purposes including: lubricating the drilling tool and drill pipe, suspending and transporting formation cuttings to the surface for filtering and disposal, holding the cuttings in suspension in the event of a shutdown of the drilling operation, and counterbalancing subterranean formation pressures to prevent the inflow of gas, oil, or water from permeable rock formations. Drilling fluids, also referred to as "drilling muds," can be water-based or organic-based, such as oil-based and so-called synthetic-based drilling fluids. The organic-based drilling fluids are frequently employed as invert emulsions with high concentrations of the organic-based fluid mixed with water in the presence of emulsifiers.

For a drilling fluid to perform its functions the drilling fluid must stay in the wellbore. Often, undesirable subterranean formation conditions are encountered during drilling during which substantial amounts of the drilling fluid can be lost to the formation. The hydrostatic pressure of the drilling fluid must be greater than the pressure of the fluids in the formation to prevent formation fluids from entering the wellbore. As a result, there is a tendency for the drilling fluid to invade the permeable subterranean formations. Drilling fluid can leave the wellbore through large or small fissures or fractures in the formation, which can be pre-existing or drilling-induced. Generally, the solids of the drilling fluid are filtered out onto the walls of the wellbore forming a filter cake, which functions as a barrier. The drilling fluids should be formulated so as to keep the deposited filter cake permeability as low as possible in order to maintain a stable borehole and minimize filtrate invasion of, and damage to, potentially productive strata in the subterranean formation. Fluid-loss additives can be added to the drilling fluid to reduce the loss of the drilling fluid to the surrounding formation. However, unacceptable losses of drilling fluid to the surrounding subterranean formation can still occur despite the type of drilling fluid employed and the fluid loss additive used.

There is a need, therefore, for improved fluid loss additives that can reduce the loss of drilling fluids to the formation while drilling.

SUMMARY

Methods for treating oil-based drilling fluids with a fluid loss additive are provided. In at least one specific embodiment, an oil-based drilling fluid and a hydrocarbon resin can be combined to produce a treated oil-based drilling fluid. The hydrocarbon resin can include a polymerized product of a reaction mixture that can include a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

In another specific embodiment, an oil-based drilling fluid can be combined with a reaction product of at least one ethylenically unsaturated lower aliphatic dicarboxylic acid (or anhydride) and a hydrocarbon resin. The hydrocarbon resin can include a polymerized product of a reaction mixture that can include a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof; and at least one member selected from the group consisting of: the group consisting of: a fatty acid-containing material, a rosin acid-containing material, and a mixture thereof.

In another specific embodiment, an oil-based drilling fluid can be combined with a reaction product of at least one ethylenically unsaturated lower aliphatic dicarboxylic acid or anhydride and a hydrocarbon resin to produce a treated oil-based drilling fluid. The hydrocarbon resin can include a polymerized product of a reaction mixture that can include a dicyclopentadiene; at least one member selected from the group consisting of: a dimer of an aliphatic cyclic diene having five carbon atoms, a dimer of a non-cyclic diene having five carbon atoms, a monoolefin, a diolefin, or a polyene, each having more than five carbon atoms and having no aromatic rings, a $C_5$-olefin, a debutanized aromatic concentrate, and any mixture thereof; and at least one member selected from the group consisting of: a fatty acid-containing material, a rosin acid-containing material, and a mixture thereof. The method can further include introducing the treated oil-based drilling fluid to a wellbore.

DETAILED DESCRIPTION

It has been surprisingly and unexpectedly discovered that hydrocarbon resins can be used as fluid loss additives for oil-based drilling fluids. The hydrocarbon resin can be made by polymerizing at least three components: (1) a dicyclopentadiene; (2) at least one member selected from the group consisting of: (a) one or more dimers of one or more aliphatic cyclic dienes each having five carbon atoms, one or more dimers of one or more aliphatic non-cyclic dienes each having five carbon atoms, or a mixture thereof, (b) one or more $C_5$-olefins, (c) one or more monoolefins having greater than five carbon atoms and no aromatic rings, one or more diolefins having greater than five carbon atoms and no aromatic rings, one or more polyenes having greater than five carbon atoms and no aromatic rings, or any mixture thereof, (d) one or more debutanized aromatic concentrates, and (e) any mixture thereof; and (3) at least one member selected from the group consisting of: one or more fatty acid-containing materials, one or more rosin acid-containing materials, and a mixture thereof. The hydrocarbon resin can also be modified by reaction with one or more ethylenically unsaturated lower aliphatic dicarboxylic acids, one or more ethylenically unsaturated lower aliphatic dicarboxylic anhydrides, or both.

The oil-based drilling fluids can include one or more oleaginous fluids, one or more non-oleaginous fluids, one or more emulsifiers, and one or more additives. The oil-based drilling fluid can be an emulsion, suspension, and/or dispersion. For example, the oil-based drilling fluid can be an invert emulsion where the oleaginous fluid can be the continuous phase and the non-oleaginous fluid can be the discontinuous phase. As used herein, the term "oleaginous" refers to a hydrocarbon or oil.

The components of the drilling fluid can be mixed, blended, contacted, or otherwise combined with one another using any suitable method. The components of the drilling fluid can also be added or combined with one another in any order or sequence. For example, a desired quantity of oleaginous fluid and a suitable amount of an emulsifier can be mixed together with the remaining components added sequentially under continuous mixing. The hydrocarbon resin can be mixed, blended, contacted, or otherwise combined with the oil-based drilling fluid to produce a treated oil-based drilling fluid. The hydrocarbon resin can be combined with one or more components, e.g., the oleaginous fluid, to produce an intermediate mixture and the intermediate mixture can be combined with the remaining components of the drilling fluid, e.g., the non-oleaginous fluid, the emulsifier, and the additive, to produce the treated oil-based drilling fluid.

The dicyclopentadiene ("first component") of the hydrocarbon resin can be in any form and from any source. The dicyclopentadiene can be exo-dicyclopentadiene (exo-DCPD), endo-dicyclopentadiene (endo-DCPD), or a mixture thereof. A substantially pure, e.g., 95 wt % to essentially 100 wt %, dicyclopentadiene feed stock can be used. In another example, a dicyclopentadiene-rich hydrocarbon fraction can be used. Such dicyclopentadiene-rich hydrocarbon fraction can include at least 40 wt %, at least 60 wt %, or at least 70 wt % of dicyclopentadiene and lesser amounts, e.g. from about 1 wt % to about 30 wt %, of methyl dicyclopentadiene and co-dimers of cyclopentadiene and methyl cyclopentadiene. It can also be possible to use essentially 100 wt % of methyl dicyclopentadiene or dimethyl-dicyclopentadiene as the first component. Other materials can be present in the dicyclopentadiene-rich hydrocarbon fraction in amounts which do not materially affect the performance of the dicyclopentadiene-rich hydrocarbon fraction; however, they can be involved in some side reactions during the production of the hydrocarbon resins. Such materials can include, but are not limited to, vinyl toluene, styrene, α-methyl styrene, indene, coumarone, methyl coumarone, dimethyl styrene, methyl indene, benzene, toluene, $C_8$ aromatics, cumene, ethyl toluene, 1,2,4-trimethyl benzene, 1,2,3-trimethyl benzene, 1,3,5-trimethyl benzene, indane, naphthalene, non-aromatic hydrocarbons, diolefinic cyclic hydrocarbons such as $C_5$ co-dimers and $C_4$-$C_5$ co-dimers, or any mixture thereof. These materials can be present in the dicyclopentadiene-rich hydrocarbon feed stream in an amount of less than 35 wt %, less than 20 wt %, less than 15 wt %, or less than 10 wt %, based on the total weight of the hydrocarbon resin.

The dicyclopentadiene component can be present in the reaction mixture in a predominant amount, i.e., in an amount greater than each of component (2) and component (3). For example, the dicyclopentadiene can be present in an amount of more than 35 wt %, more than 40 wt %, more than 45 wt %, more than 50 wt %, more than 55 wt %, more than 60 wt %, more than 65 wt %, more than 70 wt %, more than 75 wt %, or more than 85 wt %, where component (2) and component (3) are each present in an amount of less than 35 wt %, based on the combined weight of the dicyclopentadiene, component (2), and component (3). In another example, the dicyclopentadiene can be present in an amount from about 40 wt % to about 60 wt %, about 40 wt % to about 85 wt %, about 50 wt % to about 85 wt %, about 50 wt % to about 75 wt %, about 60 wt % to about 85 wt %, about 60 wt % to about 85 wt %, or about 70 wt % to about 99 wt %, based on the combined weight of the dicyclopentadiene, component (2), and component (3).

Illustrative dimers of aliphatic cyclic dienes and dimers of non-cyclic dienes, each diene having five carbon atoms (an optional "second component") of the hydrocarbon resin can include, but are not limited to, dimers of isoprene, dimers of cis-piperylene, dimers of trans-piperylene, co-dimers thereof, trimers thereof, co-trimers thereof, or any mixture thereof. The dimer of the aliphatic cyclic diene and/or the dimer of the non-cyclic diene, if present, can be from a low of about 60 wt %, about 70 wt % or about 75 wt %, to a high of about 80 wt %, about 90 wt %, or about 98 wt %, based on a total weight of the dimer of the aliphatic cyclic diene and the dimer of the non-cyclic diene. For example, the dimer of the aliphatic cyclic diene and the dimer of the non-cyclic diene can be from about 60 wt % to about 70 wt %, about 70 wt % to about 85 wt %, or about 80 wt % to about 98 wt %, based on the total weight of the dimer of the aliphatic cyclic diene and the dimer of the non-cyclic diene. The dimer of the aliphatic cyclic diene and dimer of the non-cyclic diene can also include higher polymers of isoprene, cis-piperylene, trans-piperylene, cyclopentadiene, or any mixture thereof. For example, the amount of the higher polymers of isoprene, cis-piperylene, trans-piperylene, and/or cyclopentadiene can be from a low about 2 wt %, about 5 wt %, or about 10 wt %, to a high of about 20 wt %, about 30 wt %, or about 40 wt %. In another example, the higher polymers of isoprene, cis-piperylene, trans-piperylene, and/or cyclopentadiene can be present in an amount of about 2 wt % to about 10 wt %, about 10 wt % to about 20 wt %, or about 20 wt % to about 40 wt %, based on the total weight of the dimer of the aliphatic cyclic diene and the dimer of the non-cyclic diene. Feedstocks of this type can include those discussed and described in U.S. Pat. Nos. 3,290,275 and 3,478,005.

The one or more monoolefins (an optional "second component") of the hydrocarbon resin having more than five carbon atoms and having no aromatic rings can include acyclic α-olefins where the double bond is between a terminal carbon and the adjacent carbon. Acyclic α-olefins can include, but are not limited to: 1-octene, 2-ethyl-1-hexene, 2-tert-butyl-3,3-dimethyl-1-butene, 1-decene, 4-cyclohexyl-1-butene, 1-dodecene, 1-tetradecene, 1-pentadecene, 1-hexadecene, 1-heptadecene, 1-octadecene, 1-nonadecene, 1-eicosene, 3-tert-butyl-1-hexadecene, 3,7,11,15-tetramethyl-1-hexadecene, 1-heneicosene, 19-methyl-1-eicosene, 1-docosene, 1-tetracosene, 1-hexacosene, 1-octacosene, 1-nonacosene, 1-triacontene, 2-ethyl-1-nonacosene, 1-dotriacontene, or any mixture thereof. α-olefins can be commercially prepared either by a building up process of ethylene oligomerization (using either Ziegler or non-Ziegler catalysts systems) or by the wax-cracking and paraffin dehydrogenation processes. The former process gives high purity α-olefins. Illustrative processes for producing α-olefins can include those discussed and described in U.S. Pat. Nos. 3,482,000; 3,689,584; and 3,391,318.

Monoolefins having more than five carbon atoms and having no aromatic rings can also include acyclic non-α-olefins where the double bond is not between a terminal carbon and the adjacent carbon. Acyclic non-α-olefins can include, but are not limited to: 2-octene, 2,4,4-trimethyl-2-pentene, 2,3,4-trimethyl-3-hexene, 1-cyclohexyl-2-butene, 7-tetradecene, 7-pentadecene, 2-hexadecene, 4-hexadecene, 8-heptadecene, 2-octadecene, 3-octadecene, 7-octadecene, 7,8-diethyl-7-tetradecene, 9-nonadecene, 5-ethyl-7-methyl-6-hexadecene, 5-eicosene, 3,7,11,15-tetramethyl-2-hexadecene, 3-heneicosene, 9-pentacosene, 13-hexacosene, 14-octacosene, 2,25-dimethyl-13-heptacosene, or any mixture thereof.

Monoolefins having more than five carbon atoms and having no aromatic rings can include cyclic monoolefins. Cyclic monoolefins can include, but are not limited to: cyclohexene, methylcyclopentenes, methylcyclohexenes, methylcycloheptenes, cyclopentylcyclopentenes, cyclohexylcyclohexenes, cyclopentadecene, dibutylcycloheptenes, cyclohexadecene, 1,2,3-tributylcyclobutene, cyclooctadecene, 1-decylcyclooctene, dicyclohexylcyclohexenes, dicyclohexylcyclohexen-1-ylmethane, cyclodocosene, cyclotetracosene, cyclohexacosene, methylenecyclohexane, methylenecycloheptane, 1,1,4,4-tetramethyl-7-methylenecyclononane, cyclopentylidenecyclopentane, cyclohexylidenecyclohexane, dicyclohexylcyclohexylidenemethane, or any mixture thereof.

Monoolefins having more than five carbon atoms and having no aromatic rings can include bicyclic monoolefins. Bicyclic monoolefins can include, but are not limited to: bicyclo[3.2.2]non-2-ene, bicyclo[12.1.0]pentadec-1-ene, 14-methylbicyclo[10.3.0]pentadec-1(12)-ene, 3-butyl-2-isopropyl-1,7,7-trimethylbicyclo[2.2.1]hept-2-ene, 5-decylbicyclo[2.2.1]hept-2-ene, 2,3-dibutyl-1,7,7-trimethylbicyclo[2.2.1]hept-2-ene, bicyclo[12.3.1]octadec-14-ene, bicyclo[10.8.0]eicos-1(12)-ene, 5-tetradecylbicyclo[2.2.1]hept-2-ene, bicyclo[12.8.0]docos-1(14)-ene, bicyclo[26.10.0]octatriacont-1(28)-ene, 2-methylenebicyclo-[3.2.0]heptane, 5-ethylidene-6-methylbicyclo[2.1.1]hexane, 1,2,2-trimethyl-3-methylenebicyclo[2.2.1]heptane, spiro[2.5]oct-5-ene, spiro[3.4]oct-5-ene, 5-methylspiro[2.4]hept-4-ene, spiro[4.4]non-1-ene, spiro[4.5]dec-6-ene, spiro[5.5]undec-1-ene, spiro[5.5]undec-2-ene, spiro[4.11]hexadec-6-ene, spiro[10.11]docos-12-ene, 1-methylenespiro[2.4]heptane, 1-methylenespiro[4.4]nonane.

Monoolefins having more than five carbon atoms and having no aromatic rings can include polycyclic monoolefins. Polycyclic monoolefins can include, but are not limited to: 1,2,3,4,4a,5,6,7,8,9,9a,10-dodecahydroanthracene; 1,2,3,4,4a,5,6,7,8,8a-decahydro-5,5,8a-trimethylcyclobuta[a]naphthalene; 9,9-dimethyl-1,2,3,4,4a,5,6,7,8,9,10,10a-dodecahydrophenanthrene; 1,2,3,4,4a,4b,5,6,7,8,8a,9,10,12a,12b-hexadecahydrotriphenylene; 1,2,3,4,4a,4b,5,6,7,8,8a,8b,9,12,12a,12b-hexadecahydrotriphenylene; 6,6-dimethyl-1,2,3,4,5,5a,6,7,7a,8,9,10,11,12-tetradecahydrobenzo[1,2:3,4]dicycloheptene; 7-ethyl-1,2,3,4,4a,4b,5,6,7,8,8a,9-dodecahydro-1,1,4b,7-tetramethylphenanthrene; 1,4:5,8-dimethanododecahydroanthracenes; 2,3,4,4a,5,6,7,8,9,10,11,11b-dodecahydro-7,10-methano-4,4,1b,12-tetramethyl-1H-cyclohepta[a]naphthalene; octahydroacenaphthenes; decahydrophenalenes; 3,7-dimethyl-3a,3b,4,5,6,7-hexahydro-4-isopropyl-1H-cyclopenta-[1,3]cyclopropa[1,2]benzene; 1,2,4-tri-butyltricyclo[3.1.0.0.6]-hex-3-ene; 1,2,3,4,4a,5,6,7,8,9,10,11,12,12a-tetradecahydro-2,9-ethanodibenzo[a,e]cyclooctene; tricyclo[3.3.1.1.7]decylidenetricyclo[3.3.1.1.7]decane; 7-cyclopropylidenedispiro[2.0.2.1]heptane; 7-methylenedispiro[2.1.4.1]decane; 10-methylenetrispiro[2.0.2.0.2.1]decene; 3,11-dimethyldispiro[5.1.5.2]pentadec-14-ene; spiro[cyclopropane-1,8'-tricyclo[3.2.1.0.4]oct[6]ene]; 2a,2b,2c,4,5,6,7,7a,7b,7c-decahydro-2,7c-diethyl-3H-cyclohepta[a]cyclopropa[c,d]pentalene; 4-tert-butyl-5',5'-dimethylspiro[cyclohexane-1,7',bicyclo[2.2.1]hept[2]ene]; or any mixture thereof.

The one or more diolefins (an optional "second component") of the hydrocarbon resin having more than five carbon atoms and having no aromatic rings can include acyclic conjugated dienes. Acyclic conjugated dienes can include, but are not limited to: 1,3-hexadiene; 2,4-heptadiene; 2,4-dimethyl-2,4-hexadiene; 2,5-dimethyl-2,4-hexadiene; 2-methyl-2,4-octadiene; 7-methyl-2,4-octadiene; 1,3-hexadecadiene; 7,9-hexadecadiene; 1,4-dicyclohexyl-1,3-butadiene; 8-methylene-6-octadecene; 3,7,11,15-tetramethyl-1,3-hexadecadiene; 7,11,15-trimethyl-3-methylene-1-hexadecene; or any mixture thereof.

The one or more diolefins having more than five carbon atoms and having no aromatic rings can include acyclic non-conjugated dienes. Acyclic non-conjugated dienes can include, but are not limited to: 1,5-hexadiene; 2-isopropyl-1,4-hexadiene; 2-isopropyl-1,5-hexadiene; 1,9-decadiene; 2,6-dimethyl-2,6-octadiene; 1,13-tetradecadiene; 4,4,7,7-tetramethyl-1,9-decadiene; 2,6,10-trimethyl-2,6-dodecadiene; 2,6,10-trimethyl-2,8-dodecadiene; 1,9-octadecadiene; 6,9-octadecadiene; 1,17-octadecadiene; 1,19-eicosadiene; 1,20-heneicosadiene; 1,22-hentriacontadiene; or any mixture thereof.

The one or more diolefins having more than five carbon atoms and having no aromatic rings can include cyclic conjugated diolefins. Cyclic conjugated diolefins can include, but are not limited to: 1,3-cyclohexadiene; methylcyclopentadienes; 1,2,4-trimethyl-1,3-cyclohexadiene; 2,6,6-trimethyl-1,3-cyclohexadiene; 1,3,5,5-tetramethyl-1,3-cyclohexadiene; 1,5,5,6-tetramethyl-1,3-cyclohexadiene; 1,3-cyclododecadiene; 1,3-cyclotetradecadiene; 1,2,3-tris-tert-butyl-1,3-cyclobutadiene; 1,5-dimethyl-3-methylenecyclohexene; 5,5-dimethyl-3-methylenecyclohexene; 6,6-dimethyl-1-vinylcyclohexene; 1,2-dimethylenecyclohexane; 1-allylidene-2,2-dimethylcyclopropane; or any mixture thereof.

The one or more diolefins having more than five carbon atoms and having no aromatic rings can include bicyclic conjugated diolefins. Bicyclic conjugated diolefins can include, but are not limited to: 2,3,3a,7a-tetrahydroindene; bicyclo[4.2.1]nona-2,4-diene; spiro[4.4]nona-1,3-diene; 7-isopropylbicyclo[4.1.0]hepta-2,4-diene; 5-methyl-1,2,3,4,4a,8a-hexahydronaphthalene; 7,7,8,8-tetramethylbicyclo[4.2.0]octa-2,4-diene; 3a,6-dimethyl-1,2,3,3a,4,8a-hexahydro-1-isopropylazulene; 4,5,6,7-tetrahydroindene; 6,6-dimethyl-2-vinylbicyclo[3.1.1]hept-2-ene; 3a,7a-dimethyl-1-(1,5-dimethylhexyl)-3a,6,7,7a-tetrahydro-4-vinylindan; 2-allylidenebicyclo[2.2.1]heptane; 2,3-dimethylenebicyclo[2.2.1]heptane; or any mixture thereof.

The one or more diolefins having more than five carbon atoms and having no aromatic rings can include polycyclic conjugated diolefins. Polycyclic conjugated diolefins can include, but are not limited to: 1,4a-dimethyl-1,2,3,4,4a,4b,5,6,10,10a-decahydrophenanthrene; 1,2,3,4,5,6,9,10,11,12,13,14,14a,14b-tetradecahydrocyclobuta[1,2,3,4]dicyclononene; 1,2,3,4,4a,4b,5,6,10,10a-decahydro-7-isopropyl- 1,1,4a-trimethylphenanthrene; 1,2,3,4,4a,4b,5,8,8a,9,10,10a-dodecahydro-8-methylene-1,1,4a,7,8a-pentamethylphenanthrene; 1,2,3,4,5,6,7,8,9,10-decahydro-1,1,5,5,6,6,10,10-octamethylcyclobuta[1,2,3,4]dicycloheptene; tricyclo[4.3.1.0.16]deca-2,4-diene; tricyclo[4.3.1.0$^7$.9]deca-2-4-diene; mixtures thereof.

The one or more diolefins having more than five carbon atoms and having no aromatic rings can include cyclic non-conjugated diolefins. Cyclic non-conjugated diolefins can include, but are not limited to: 1,5-cyclooctadiene; 1,2,4-trimethyl-1,4-cyclohexadiene; 1,3,5-trimethyl-1,4-cyclohexadiene; 2,6,6-trimethyl-1,4-cycloheptadiene; 1,9-cyclohexadecadiene; 1,10-cyclooctadecadiene; 1,12-cyclodocosadiene; 1,13-cyclotetracosadiene; 1,4-dimethyl-4-vinylcyclohexene; 1,10-bis(3-cyclohexen-1-yl)decane; and mixture thereof.

The one or more diolefins having more than five carbon atoms and having no aromatic rings can include bicyclic non-conjugated diolefins. Bicyclic non-conjugated diolefins can include, but are not limited to: bicyclo[3.3.1]nona-2,6-diene; bicyclo[3.2.2]nona-2,6-diene; 4-ethylbicyclo[3.2.1]octa-2,6-diene; 1,4,4a,5,6,9,10,10a-octahydrobenzocyclooctene; bicyclo[8.2.2]tetradeca-11,13-diene; 4,11,11-trimethyl-8-methylenebicyclo[7.2.0]undec-4-ene; 2,4a,5,6,7,9a-hexahydro-3,5,5,9-tetramethyl-1H-benzocycloheptene; 1,2,3,3a,4,7,8,11,12,12a-decahydro-1-isopropyl-3a,6,10-trimethylcyclopentacycloundecene; 1,6-dimethyl-2-isopropyl-1,2,3,5,6,7,8,8a-octahydro-1-propyl-6-vinylnaphthalene; or any mixture thereof.

The one or more diolefins having more than five carbon atoms and having no aromatic rings can include polycyclic non-conjugated diolefins. Polycyclic non-conjugated diolefins can include, but are not limited to: 1,2,3,4,5,6,7,8,9,10-decahydroanthrancene; 1,2,4,4a,5,6,8,8a-octahydro-4,4,8,8-tetramethyl-S-indacene; 1,2,3,4,6a,6b,9,10,11,12,12a,12b-dodecahydrocyclobuta[1,2:3,4]dicyclooctene; 1,2,3,4,4a,6,7,8,8a,9-decahydro-1,1,4a,8a-tetramethylphenanthrene; 1,2,3,4,4b,5,8,8a,9,10-decahydro-7-isopropyl-1,1,4b-trimethylphenanthrene; 1,3,4,8-tetra-tertbutyltricyclo[4.2.0.0.5]octa-3,7-diene; tricyclo[4.2.2.0.5]deca-7,9-diene; 9,10-diisopropylidenetricyclo[4.2.1.1.5]decane; 1,4,4a,5,8,8a,9,9a,10,10a-decahydro-5-methyl-1,4:9,10-dimethanoanthracene; 1,2,3,4,4,a,5,6,9,10,13,14,14a-dodecahydro-1,4-methanobenzocyclododecene; 15,16-dimethyltricyclo[9.3.1.1.8]hexadeca-1(15),8(16)-diene; 1,2,3,4,5,6,7,8,9,10,11,12-dodecahydro-2,9-ethanodibenzo[a,e]cyclooctene; dispiro[2.2.2.2]deca-4,9-diene; 7,14-dimethylenedispiro[5.1.5.1]tetradecane; 7-tertbutyldispiro[2.2.4.2]deca-4,11-diene; 3,3"-dimethyldispiro[bicyclo[2.2.1]hept-5-ene-2,1'-cyclobutane-3',2"-bicyclo[2.2.1]hept[5]ene]; or any mixture thereof.

The one or more polyenes (an optional "second component") of the hydrocarbon resin having more than five carbon atoms and having no aromatic rings can include acyclic conjugated polyenes. Illustrative acyclic conjugated polyenes can include, but are not limited to: 1,3,5-hexatriene; 1,3,5,7-octatetraene; 3-ethyl-1,3,5-hexatriene; 2,4-dimethyl-1,3,5-hexatriene; 2,5-dimethyl-1,3,5-hexatriene; 3,7-dimethyl-1,3,7-octatriene; 3,7,11-trimethyl-1,3,6,10-dodecatetraene; 9-isopropyl-6,10,10-trimethyl-2,4,6,8-undecatetraene; or any mixture thereof.

The one or more polyenes having more than five carbon atoms and having no aromatic rings can include acyclic non-conjugated polyenes. Illustrative cyclic non-conjugated polyenes can include, but are not limited to: 5-ethyl-1,4,8-nonatriene; 2,6-dimethyl-1,5,8-undecatriene; 2,8-dimethyl-1,4,9-undecatriene; 1,6,10,14-hexadecatetraene; 2,6,10-trimethyl-2,6,10-tetradecatriene; 1,6,11,17-octadecatetraene; 1,8,11-octadecatriene; 3,6,9,12,15-nonadecapentaene; 4,7,10,13-nonadecatetraene; 4,7-di-(isobuten-1-yl)-2,9-dimethyldeca-2,8-diene; 1,5,9,13,17-heneicosapentaene; 1,6,9,12,15-heneicosapentaene; or any mixture thereof.

The one or more polyenes having more than five carbon atoms and having no aromatic rings can include cyclic conjugated polyenes. Illustrative cyclic conjugated polyenes can include, but are not limited to: 1,3,5-cyclooctatriene-2,3,7,7-tetramethyl-1,3,5-cycloheptatriene; 1,3,10,12-cyclooctadecatetraene; 1,3,11,13-cycloeicosatetraene; 14-isopropyl-3,7,11-trimethyl-1,3,6,10-cyclotetradecatetraene; 4-isopropyl-1,7,11-trimethyl-1,3,7,11-cyclotetradecatetraene; 5-methylene-1,2,3,4-tetramethyl-1,3-cyclopentadiene; 2-(2,2-dimethylpropyl)-6-methylene-1,3,4,5,5-pentamethyl-1,3-cyclohexadiene; 1,2,3,3,4,5-hexaethyl-6-ethylidene-1,4-cyclohexadiene; 1,5-dimethyl-4-isopropenyl-1,3-cyclopentadiene; 1,1,2-trimethyl-5-vinyl-2,4-cyclopentadiene; 4-isopropenyl-1,2-dimethyl-1,4-cyclohexadiene; 1,3,3-trimethyl-2-(1,3-butadienyl)-cyclohexene; 3-methyl-1-(2,6,6-trimethyl-1-cyclohexen-1-yl)-1,3,5-hexatriene; 1-[3-(heptenyl)-3-cycohexen-1-yl]-1,3-nonadiene; bi-1,3,5-cyclohepatrien-1-yl; 1,8-bis(1,3-cyclopentadiene-1-yl)octane; or any mixture thereof.

The one or more polyenes having more than five carbon atoms and having no aromatic rings can include bicyclic conjugated polyenes. Illustrative bicyclic conjugated polyenes can include, but are not limited to: 2-methylbicyclo[3.2.0]hepta-1,4,6-triene; bicyclo[4.2.0]octa-2,4,7-triene; bicyclo[4.2.2]deca-2,4,7,9-tetraene; 4,5,6,7-tetrahydro-1H-benzocycloheptene; 2,3,4,7-tetrahydro-1H-benzocycloheptene; 3,5,5-trimethyl-4a,5,8,8a-tetrahydronaphthalene; 2,4-di-tert-butylbicyclo[4.2.0]octa-2,4,7-triene; 6-(1,3-cyclopentadiene-1-yl)bicyclo[5.4.1]dodeca-2,4,7,9,11-pentaene; 1,2,6,7,8,8a-hexahydro-8a-methyl-3-vinylnaphthalene; 3,4,4a,5,8,8a-hexahydro-8a-methyl-1-vinylnaphthalene; 4,8-dimethyl-2-isopropylidene-1,2,3,3a,4,8a-hexahydroazulene; 9,10-diallylidenebicyclo[6.2.0]deca-1(8),2,6-triene; 1,1-dimethyl-2-(4-methyl-1,3-pentadienyl)-4,5,6,7-tetrahydro-1H-indene; 1-(2-methylenecyclohexylidene)-2-(bicyclo[4.4.0]decyclidene)ethane; 2,3,4,6,7,8-hexahydro-1,1,4,4,8,8-hexamethyl-5-isopropenyl-1H-benzocycloheptene; or any mixture thereof.

The one or more polyenes having more than five carbon atoms and having no aromatic rings can include polycyclic conjugated polyenes. Illustrative polycyclic conjugated polyenes can include, but are not limited to: 1,4a-dimethyl-7-isopropyl-1,2,3,4,4a,4b,5,10a-octahydrophenanthrene; 1,2,3,4,4a,4b,5,6,10,10a-decahydro-7-isopropyl-1-methylene-4a-methylphenanthrene; tricyclo[8.4.2.0.9]hexadeca-3,5,7,11,13,16-hexaene; 1,2,3,5,5a,6,7,8,10,10a-decahydropyrene; spiro[cyclohexene-1,10'(2'H)-[5,9]methanobenzocyclooctene]; or any mixture thereof.

The one or more polyenes having more than five carbon atoms and having no aromatic rings can include cyclic non-conjugated polyenes. Illustrative cyclic non-conjugated polyenes can include, but are not limited to: 1,5,9-cyclodocatriene; 1,5,9,13-cyclohexadecatetraene; 1,5,9,13,17-cycloeicosapentaene; 1,9,17-cyclotetracosatriene; 1,9,17,25-cyclodotriacontatetraene; 1,3,3-trimethyl-6-vinyl-1,4-cyclohexadiene; 1-methyl-3-(1,1,2-trimethyl-2-propenyl)-1,4-cyclhexadiene; 12-vinyl-1,5,9-cyclotetradecatriene; 3-(2-butenyl)-1,5,9-cyclododecatriene; 16-vinyl-1,5,9,13-cyclooctadecatetraene; 1,4,7,10-tetrakis(methylene)cyclododecane; cyclohexenyldicyclohexenyls; 6-methyl-2-

[3-(4-methyl-3-pentenyl)-3-cyclohexen-1-yl]-1,5-heptadiene; or any mixture thereof.

The one or more polyenes having more than five carbon atoms and having no aromatic rings can include bicyclic non-conjugated polyenes. Illustrative bicyclic non-conjugated polyenes can include, but are not limited: bicyclo[2.2.2]octa-2,5,7-triene; spiro[4.5]deca-2,6,9-triene; 3,7,11,15,15-pentamethylbicyclo[12.1.0]-pentadeca-2,6,10-triene; or any mixture thereof.

The one or more polyenes having more than five carbon atoms and having no aromatic rings can include polycyclic non-conjugated polyenes. Illustrative polycyclic non-conjugated polyenes can include but are not limited to: 3,4,4a,4b,7,8,8a,10a-octahydrophenanthrene; tricyclo[20.8.0.0.16]triaconta-1(22),7(16),9,13,24,28-hexaene; 1,4,4a,5,6,9,10,13,14,14a-decahydro-1,4-methanobenzocyclododecene; tricyclo[3.3.2.8]deca-3,6,9-triene; dispiro[bicyclo[2.2.1]hepta-2,5-diene-7,1'-cyclopropane-2',7''-bicyclo-[2.2.1]hepta[2,5]diene]; or any mixture thereof.

The one or more polyenes having more than five carbon atoms and having no aromatic rings can include terpenes. Illustrative terpenes can include, but are not limited to: myrcene, ocimene, alloocimene, p-menth-3-ene, d,l-dipentene, α-terpinene, α-pinene, β-pinene, camphene, longifolene, α-cedrene, or any mixture thereof.

The monoolefins, diolefins, and polyenes having greater than five carbon atoms and no aromatic rings in their structure can be produced by the thermal or catalytic cracking of one or more hydrocarbon materials. Feed materials to such cracking processes can be petroleum crudes of an aromatic, naphthenic, or paraffinic nature as well as mixed crudes. Additionally, feed materials can be gaseous, liquid or tar-like hydrocarbon materials. The products resulting from such cracking processes can be gaseous, liquid, or tar-like in nature or mixtures thereof. The cracked products can be separated and isolated into more discrete fractions of a narrower carbon number and certain structural types by various processes well known in the art such as distillation, compression-absorption process, adsorption and desorption.

A large variety of such cracking processes that can be used to produce the monoolefins can include the processes known as the UOP dehydrogenation process, the Houdry dehydrogenation process, the Standard Oil of New Jersey process, the Phillips Petroleum pebble heater process, the T.P.C. process of the Socony Vacuum Oil Co., the Koppers-Hasche-Wulff process, the Kellogg steam pyrolysis process, the Lurgi-Ruhrgas sandcracker process, the Ruhrgas oil pyrolysis, and the Ugite process. Many of these cracking processes are discussed and described in "MONOOLEFINS, Chemistry and Technology" by F. Asinger, Pergamon Press (Translation up-date by B. J. Hazzard in 1968).

The monoolefins, diolefins, and polyenes having greater than five carbon atoms and no aromatic rings in their structure can be produced by a Diels-Alder reaction, such as a Diels-Alder reaction between 1,3 conjugated diolefins and any olefin, diolefin, and/or polyene. A more thorough discussion of the Diels-Alder synthesis of unsaturated hydrocarbons is contained in "The Chemistry of Alkenes" by Saul Patai, Interscience Publishers, 1964, especially Chapter 11, Part V, The Diels-Alder Reaction, pages 878-953.

The one or more $C_5$ olefins (an optional "second component") of the hydrocarbon resin can include, but is not limited to, 1-pentene, 2-methyl-1-butene, 2-methyl-2-butene, cyclopentene, cis-2-pentene, trans-2-pentene, or any mixture thereof.

The debutanized aromatic concentrate (an optional "second component") of the hydrocarbon resin can include, but are not limited to, Debutanized Aromatic Concentrate-B (DAC-B), Debutanized Aromatic Concentrate-C (DAC-C), or a mixture thereof. DAC-B can include a mixture of saturated, unsaturated, and aromatic hydrocarbons and can have an initial boiling point greater than about 60° C. DAC-B can include about 87% to about 91% carbon and from about 9% to about 13% hydrogen, and can have an iodine number of about 195 to about 350. DAC-B can include toluene, one or more xylenes, styrene, 5-methyl-bicyclohept-2-ene, 6-methylene-5-methyl-bicyclohept-2-ene, or any mixture thereof. DAC-B can be prepared by the pyrolysis of a natural gas stream that includes propane or propane-ethane mixtures. The composition of DAC-B can vary widely, being dependent upon the natural gas cracking feed and various operating conditions, e.g., processing temperature, processing pressure and processing residence time, maintained during the preparation process. DAC-C can include toluene, one or more $C_9$-$C_{15}$ cyclic, $C_9$-$C_{15}$ bicyclic, $C_9$-$C_{15}$ tricyclic, and/or $C_9$-$C_{15}$ polycyclic olefins and/or diolefins. DAC-C can have a specific gravity at about 15.6° C. of about 0.921, and a Gardner Color of about 1, as measured according to ASTM D-1544. DAC-B is described in more detail and can be made in accordance with the procedures discussed and described in U.S. Pat. Nos. 3,357,914; 3,437,629; 3,467,615; and 3,701,760.

The second component can be present in the reaction mixture in an amount from a low of about 1 wt %, about 5 wt %, about 7 wt %, or about 10 wt %, to a high of about 20 wt %, about 25 wt %, or about 35 wt %, based on the combined weight of the first component, the second component, and the third component. For example, the second component can be present in the reaction mixture in an amount from about 5 wt % to about 10 wt %, about 10 wt % to about 15 wt %, about 15 wt % to about 20 wt %, about 20 wt % to about 25 wt %, about 25 wt % to about 30 wt %, or about 30 wt % to about 35 wt %, based on the total weight of the three components in the reaction mixture.

The one or more fatty acid-containing materials (an optional "third component) of the hydrocarbon resin can include, but is not limited to, one or more saturated fatty acid-containing materials, one or more unsaturated fatty acid-containing materials, and any mixtures thereof. The fatty acids in the fatty acid-containing material can have 6 to 24 carbon atoms per molecule or mixtures thereof. The fatty acids can be olefinic fatty acids, diolefinic fatty acids, conjugated diolefinic acids, polyolefinic fatty acids and alicyclic fatty acids. Saturated fatty acids can include, but are not limited to, lauric acid, myristic acid, palmitic acid, margaric acid, stearic acid, arachidic acid, or any mixture thereof. Olefinic fatty acids can include, but are not limited to, undecylenic acid, lauroleic acid, physeteric acid, myristoleic acid, palmitoleic acid, hydnocarpic acid, petroselinic acid, oleic acid, elaidic acid, chaulmoogric acid, erucic (cis) acid, or any mixture thereof. Diolefinic acids can include α-linoleic acid. Conjugated diolefinic acids can include, but are not limited to, α-eleostearic acid, β-eleostearic acid, or any mixture thereof. Polyolefinic acids can include, but are not limited to, α-linoleic acid, linolenic acid, or any mixture thereof. Alicyclic fatty acids can include, but are not limited to, hydnocarpic acid, chaulmoogric acid, or any mixture thereof.

Fatty acid-containing materials can include, but are not limited to: vegetable acids and/or oils; animal acids and/or oils such as fish acids and/or oils; tall oil such as crude tall oil and distilled tall oil; tall oil fatty acids; fatty acids modified by reaction with α,β unsaturated carboxylic acids and/or acid anhydrides; and any mixture thereof. Vegetable oils can include, but are not limited to, coconut oil, palm kernel oil, corn oil, cottonseed oil, olive oil, palm oil, peanut oil, sesame oil, sunflower seed oil, linseed oil, soybean oil, rapeseed (colza) oil, tung (China wood) oil, castor oil, or any mixture thereof. Animal oils can include, but are not limited to, lard and tallow. Fish oils can include, but are not limited to, whale oil, gray seal oil, menhaden oil, cod liver oil, Japanese sardine oil, herring oil and California sardine (pilchard) oil, or any mixture thereof.

In one embodiment, the fatty acids-containing materials can be substantially pure, e.g., 95 wt % to essentially 100 wt % of fatty acids, based on the total weight of the fatty acid-containing material. In another embodiment, the fatty acid-containing materials can contain at least 50 wt %, at least 60 wt %, at least 70 wt %, at least 80 wt %, at least 90 wt %, at least 95 wt %, or at least 95 wt % 100 wt % of fatty acids, based on the total weight of the fatty acid-containing material. For example, the fatty acid-containing materials can contain about 10 wt % to about 20 wt %, about 20 wt % to about 30 wt %, about 30 wt % to about 40 wt %, about 40 wt % to about 50 wt %, about 50 wt % to about 60 wt %, about 60 wt % to about 70 wt %, about 70 wt % to about 80 wt %, about 80 wt % to about 90 wt %, or about 90 wt % to about 100 wt % of fatty acids, based on the total weight of the fatty acid-containing material.

The one or more rosin acid-containing materials (an optional "third component") can include, but are not limited to: gum rosins; wood rosins; tall oil such as crude tall oil and distilled tall oil; tall oil rosins; rosin acids modified by reaction with α,β unsaturated carboxylic acids and/or acid anhydrides; or any mixture thereof. Rosin acids can have a molecular represented by the formula $C_{20}H_{30}O_2$. Illustrative rosin acids can include, but are not limited to, abietic acid, dehydro-abietic acids, palustric acid, neo-abietic acid, isopimaric acid, dihydro-abietic acid, tetra-hydroabietic acid, isodextro-pimaric acid, dextro-pimaric acid, pimaric acid, Δ8,9-isopimaric acid, sandaraco-pimaric acid, levo-pimaric acid, elliotinoic acid, dihydro-isopimaric acid, dihydro-pimaric acid, tetrahydro-isopimaric acid, tetrahydro-pimaric acid, or any mixture thereof.

In one embodiment, the rosin acids-containing materials can be substantially pure, e.g., 95 wt % to essentially 100 wt % of rosin acids, based on the total weight of the rosin acids-containing materials. In another embodiment, the rosin acids-containing materials can contain at least 50 wt %, at least 60 wt %, at least 70 wt %, at least 80 wt %, at least 90 wt %, at least 95 wt %, or at least 95 wt % 100 wt % of rosin acids, based on the total weight of the rosin acids-containing materials. For example, the rosin acids-containing materials can contain about 10 wt % to about 20 wt %, about 20 wt % to about 30 wt %, about 30 wt % to about 40 wt %, about 40 wt % to about 50 wt %, about 50 wt % to about 60 wt %, about 60 wt % to about 70 wt %, about 70 wt % to about 80 wt %, about 80 wt % to about 90 wt %, or about 90 wt % to about 100 wt % of rosin acids, based on the total weight of the rosin acids-containing materials.

Various fatty acid-containing materials and rosin acid-containing materials can include those discussed and described in Kirk-Othmer Encyclopedia of Chemical Technology, Volume 1, pp. 224-240 (1963), Volume 8, pp. 811-856 (1965), and Volume 17, pp. 475-508 (1968).

As is known in the art, crude tall oil refers to the resinous yellow-black oily liquid obtained as an acidified byproduct in the kraft or sulfate processing of wood. Crude tall oil (CTO), prior to refining, can include a mixture of rosin acids, fatty acids, sterols, high-molecular weight alcohols, and other alkyl chain materials. The components of crude tall oil can depend, at least in party, on a variety of factors, such as the particular coniferous species of the wood being processed (wood type), the geographical location of the wood source, the age of the wood, the particular season that the wood is harvested, and others. Thus, depending on the particular source, crude tall oil can contain from about 20-75 wt % fatty acids (more often 30-60%), from about 20-65 wt % rosin acids and the balance being the neutral and non-saponifiable components. Crude tall oil can contain at least 10% by weight neutral material or non-saponifiable components.

The distillation of crude tall oil is often used to recover a mixture of fatty acids in the $C_{16}$-$C_{20}$ range. Fatty acids found in tall oils can include, but are not limited to, oleic acid, linoleic acid, stearic acid, and palmitic acid. Rosin acids found in tall oils can include, but are not limited to, abietic acid, dehydroabietic acid, isopimaric acid, and pimaric acid. Examples of tall oil distillation products that can be used as the fatty acids and/or rosin acids or that can make up at least a portion of the fatty acids and/or rosin acids discussed and described herein can include, but are not limited to, tall oil fatty acids (TOFA), distilled tall oil (DTO), tall oil pitch, or any mixture thereof.

The distilled tall oil fraction can have a fatty acids and esters of fatty acids concentration from a low of about 55 wt %, about 60 wt %, or about 65 wt % to a high of about 85 wt %, about 90 wt %, or about 95 wt %. The distilled tall oil fraction can have a rosin acids or rosins concentration from a low of about 5 wt %, about 10 wt %, or about 15 wt % to a high of about 30 wt %, about 35 wt %, or about 40 wt %. The distilled tall oil fraction can have a neutrals concentration from a low of about 0.1 wt %, about 1 wt %, or about 1.5 wt % to a high of about 2 wt %, about 3.5 wt %, or about 5 wt %. The distilled tall oil fraction can have an acid value from a low of about 20, about 25, or about 30 to a high of about 40, about 45, or about 50. The distilled tall oil fraction can have a viscosity (centipoise at 85° C.) from a low of about 10 cP, about 20 cP, about 30 cP, or about 40 cP to a high of about 100 cP, about 120 cP, about 135 cP, or about 150 cP. The distilled tall oil can have a density ranging from a low of about 840 g/L, about 860 g/L, or about 880 g/L to a high of about 900 g/L, about 920 g/L, or about 935 g/L. The distilled tall oil fraction can have a saponification number ranging from a low of about 180, about 185, or about 190 to a high of about 200, about 205, or about 210. The distilled tall oil fraction can have an iodine value ranging from a low of about 115, about 117, or about 120 to a high of about 130, about 135, or about 140.

The rosin acids derived from crude tall oil can also be an intermediate fraction that can be produced from the distillation of crude tall oil. The tall oil rosin can have a concentration of rosin acids ranging from a low of about 80 wt %, about 85 wt %, or about 90 wt % to a high of about 93 wt %, about 95 wt %, or about 99 wt %. The tall oil rosin can have a concentration of abietic acid ranging from a low of about 35 wt %, about 40 wt %, or about 43 wt % to a high of about 50 wt %, about 55 wt %, or about 60 wt %. The tall oil rosin can have a concentration of dehydroabietic acid ranging from a low of about 10 wt %, about 13 wt %, or about 15 wt % to a high of about 20 wt %, about 23 wt %, or about 25 wt %. The tall oil rosin can have a concentration of isopimaric acid of about 10 wt % or less, about 8 wt % or less, about 5 wt % or less, or about 3 wt % or less. The tall oil rosin can have a concentration of pimaric acid of about 10 wt % or less, about 8 wt % or less, about 5 wt % or less, or about 3 wt % or less. The tall oil rosin can have a fatty acids concentration ranging from a low of about 0.5 wt %, about 1 wt %, or about 2 wt % to a high of about 3 wt %, about 5 wt %, or about 10 wt %. The tall oil rosin can have a concentration of neutral materials ranging from a low of about 0.5 wt %, about 1 wt %, or about 2 wt % to a high of about 3 wt %, about 5 wt %, or about 10 wt %. The tall oil rosin can have a density ranging from a low of about 960 g/L, about 970 g/L, or about 980 g/L to a high of about 1,000 g/L, about 1,010 g/L, or about 1,020 g/L. The tall oil rosin can have an acid value ranging from a low of about 150, about 160, or about 165 to a high of about 170, about 175, or about 180.

The commercially available tall oil products XTOL®100, LYTOR® 100, XTOL®300, XTOL®304, and XTOL®520 DTO (all from Georgia-Pacific Chemicals LLC, Atlanta, Ga.), for example, all contain saturated and unsaturated fatty acids in the $C_{16}$-$C_{18}$ range, as well as minor amounts of rosin acids. XTOL®100 includes about 1.6 wt % of palmitic acid, about 2.5 wt % of stearic acid, about 37.9 wt % of oleic acid, about 26.3 wt % of linoleic acid, about 0.3 wt % of linolenic acid, about 2.9 wt % of linoleic isomers, about 0.2 wt % of arachidic acid, about 3.6 wt % eicosatrienoic acid, about 1.4 wt % of pimaric acid, <0.16 wt % of sandarocopimaric, <0.16 wt % of isopimaric acid, <0.16 wt % of dehydroabietic acid, about 0.2 wt % of abietic acid, with the balance being neutrals and high molecular weight species. LYTOR®100 includes <0.16 wt % of palmitic acid, <0.16 wt % of stearic acid, about 0.2 wt % of oleic acid, about 0.2 wt % of arachidic acid, about 0.2 wt % eicosatrienoic acid, about 2.2 wt % of pimaric acid, about 0.6 wt % of sandarocopimaric, about 8.5 wt % of palustric acid, about 1.6 wt % of levopimaric acid, about 2.8 wt % of isopimaric acid, about 15.3 wt % of dehydroabietic acid, about 51.4 wt % of abietic acid, about 2.4 wt % of neoabietic acid, with the balance being neutrals and high molecular weight species. XTOL®520 DTO includes about 0.2 wt % of palmitic acid, about 3.3 wt % of stearic acid, about 37.9 wt % of oleic acid, about 26.3 wt % of linoleic acid, about 0.3 wt % of linolenic acid, about 2.9 wt % of linoleic isomers, about 0.2 wt % of arachidic acid, about 3.6 wt % eicosatrienoic acid, about 1.4 wt % of pimaric acid, <0.16 wt % of sandarocopimaric, <0.16 wt % of isopimaric acid, <0.16 wt % of dehydroabietic acid, about 0.2 wt % of abietic acid, with the balance being neutrals and high molecular weight species. Such tall oil products can be used in the reaction with the polyamine or a mixture of polyamines. Other fatty acids and mixtures of fatty acids, including oxidized and/or dimerized tall oil, such those discussed below can also be employed.

Rosin acids or fatty acids can be reacted with $\alpha,\beta$ unsaturated carboxylic acids and/or acid anhydride via the ene reaction or a Diels-Alder reaction. Non-limiting examples of representative reactions that can occur can include those discussed and described in U.S. Pat. Nos. 4,927,669; 8,133,970; and 8,334,363. The ene reaction and the Diels-Alder reaction are explained in further detail in Jerry March & Michael B. Smith, MARCH'S ADVANCED ORGANIC CHEMISTRY: REACTIONS, MECHANISMS, AND STRUCTURE (7th ed. John Wiley & Sons Inc. 2013) (1985).

Non-limiting examples of $\alpha,\beta$ unsaturated carboxylic acids or anhydrides that can be reacted with rosin acids or fatty acids can include, but are not limited to, maleic acid, maleic anhydride, itaconic acid, itaconic anhydride, aconitic acid, aconitic anhydride, acrylic acid, methacrylic acid, citraconic acid, citraconic anhydride, mesaconic acid, muconic acid, glutaconic acid, methylglutaconic acid, traumatic acid, and fumaric acid. The acids and anhydrides can include any isomers (e.g., enantiomers, diastereomers, and cis-/trans-isomers), and salts.

The amount of $\alpha,\beta$ unsaturated carboxylic acid and/or acid anhydride reacted with the rosin acids or fatty acids can vary based, at least in part, on the specific rosin acid-containing material or fatty acid-containing material to be reacted. Suitable amounts of the carboxylic acid and/or acid anhydride reacted with the rosin acid can be from a low of about 1 wt %, about 2 wt %, about 3 wt %, about 5 wt %, about 10 wt %, or about 15 wt % to a high of about 30 wt %, about 35 wt %, about 40 wt %, about 45 wt %, or about 50 wt %, based on the combined weight of the rosin acid or fatty acid and the carboxylic acid and/or acid anhydride.

The reaction of rosin acids and/or fatty acids and the $\alpha,\beta$ unsaturated carboxylic acids and/or acid anhydrides can be performed at a reaction temperature of about 150° C. to about 250° C. The reaction can be quenched after a reaction time from about 1 hour to about 36 hours. The rosin acids and/or fatty acids can be substituted with the $\alpha,\beta$ unsaturated carboxylic acids or acid anhydrides from a low of about 1 wt %, about 3 wt %, or about 5 wt % to a high of about 20 wt %, about 25 wt %, or about 30 wt %, based on the total weight of the rosin acids or fatty acids modified by reaction with $\alpha,\beta$ unsaturated carboxylic acids and/or acid anhydrides. For example, the tall oil can have the tall oil substituted with the $\alpha,\beta$ unsaturated carboxylic acids or acid anhydrides from about 2 wt % to about 7 wt %, about 5 wt % to about 10 wt %, about 10 wt % to about 20 wt %, about 18 wt % to about 22 wt %, about 20 wt % to about 27 wt %, based on the total weight of the rosin acids or fatty acids modified by reaction with $\alpha,\beta$ unsaturated carboxylic acids and/or acid anhydrides.

The third component can be present in the reaction mixture in an amount from a low of about 1 wt %, about 5 wt %, about 7 wt %, or about 10 wt %, to a high of about 20 wt %, about 25 wt %, or about 35 wt %, based on the total weight of the first component, the second component, and the third component. For example, the third component can be present in the reaction mixture from about 5 wt % to about 7 wt %, about 7 wt % to about 12 wt %, about 12 wt % to about 17 wt %, about 17 wt % to about 25 wt %, about 20 wt % to about 27 wt %, about 20 wt % to about 35 wt %, based on the total weight of the first component, the second component, and the third component. The first component, the second component, and the third component can be at least 70 wt %, at least 75 wt %, at least 80 wt %, at least 85 wt %, at least 90 wt %, or at least 95 wt % of the total amount of polymerizable components in the reaction mixture.

In at least one specific embodiment, the third component can be absent from the reactant mixture used to make the hydrocarbon resin. Said another way, in one or more embodiments the hydrocarbon resin can be made by polymerizing a reaction mixture of at least two components: (1) dicyclopentadiene; and (2) at least one member selected from the group consisting of: the group consisting of: (a) the dimer of the aliphatic cyclic diene having five carbon atoms, the dimer of the aliphatic non-cyclic diene having five carbon atoms; (b) the $C_5$-olefin; (c) the monoolefin, the diolefin, and/or the polyene, each having more than five carbon atoms and no aromatic rings; (d) the debutanized aromatic concentrate; and (e) any mixture thereof. As such, the one or more fatty acid-containing materials and/or the one or more rosin acid-containing materials can be an optional component of the reactant mixture used to make the hydrocarbon resin.

One or more solvents or diluents can be present in the reaction mixture. Illustrative solvents or diluents can include, but are not limited to, n-heptane, methyl cyclohexane, n-hexane, n-decane, toluene, benzene, or any mixture thereof. The solvent can be present in the reaction mixture up to about 30 wt %, based combined weight of the first component, the second component, the third component, and the solvent or diluent. For example, the solvent can be present in the reaction mixture in an amount of about 2 wt % to about 7 wt %, about 4 wt % to about 12 wt %, about 7 wt % to about 17 wt %, about 10 wt % to about 19 wt %, about 20 wt % to about 28 wt %, or about 17 wt % to about 30 wt %, based combined weight of the first component, the second component, the third component, and the solvent.

The polymerization of the first component, the second component, and the third component or the first component and the second component can be characterized as a thermal polymerization and can be conducted in the absence of any catalyst. The polymerization temperature can be from about 200° C. to about 290° C., preferably from about 230° C. to about 270° C. Reaction times for the polymerization can be from about 4 hours to about 15 hours, about 12 hours to about 36 hours, or about 16 to about 24 hours.

Alternately, a catalyst or radical initiator can be used to polymerize the first component, the second component, and the third component or the first component and the second component. Catalysts or radical initiators can include, but are not limited to: peroxides, such as di-tert-butylperoxide; dilauroylperoxide, dicumylperoxide, 2,5-bis-(tert-butylperoxy) hexane, 2,5-dimethyl-2,5-bis-(tert-butylperoxy)-hexene, dibenzoylperoxide, and cumene hydroperoxide; and Friedel-Crafts metal salt catalysts, such as aluminum chloride, stannic chloride, boron trifluoride, boron trifluoride ethyl ether, and boron trifluoride phenol. If a catalyst or radical initiator is used, the reaction temperature can be from about −20° C. to about 270° C., about 60° C. to about 220° C., or about 40° C. to about 250° C.

The reaction pressures can be sufficient to prevent substantial loss by evaporation of the reaction components. The reaction can be conducted under substantially oxygen-free conditions to prevent darkening of the color of the resulting resin. The reaction can be conducted under an inert gas blanket such as by passing nitrogen or carbon dioxide gas through the reactor vessel and over the reaction mixture.

Any conventional reaction vessel can be employed for the polymerization reaction. The polymerization reaction can be conducted in a batch, semicontinuous, or continuous manner. The polymerization reaction can be carried out under agitation or stirring. For example, the first component, the second component, and the third component or the first component and the second component can be mixed, blended, contacted, or otherwise combined with one another to produce a reaction mixture and the components can be polymerized to produce the hydrocarbon resin. The hydrocarbon resin can be recovered from the reaction mixture by distillation or other conventional recovery methods. The polymerization can be carried out according to the methods discussed and described in U.S. Pat. Nos. 4,056,498 and 4,189,410.

The reaction mixture can be heated until the polymerized product or hydrocarbon resin has one or more desired properties such as a desired Ring and Ball softening point, an acid number, a degree of unsaturation corresponding to an iodine number, a weight average molecular weight, and/or a number average molecular weight. The hydrocarbon resin can have a Ring and Ball softening point from a low of about 110° C., about 115° C., or about 120° C., to a high of about 170° C., about 175° C., about 180° C., as measured according to ASTM E-28. For example, the hydrocarbon resin can have a Ring and Ball softening point of about 110° C. to about 125° C., about 125° C. to about 150° C., about 150° C. to about 165° C., or about 165° C. to about 180° C., as measured according to ASTM E-28.

The hydrocarbon resin can have an acid number from a low of about 1, about 1.5, or about 2, to a high of about 6, about 7, or about 8. For example, the hydrocarbon resin can have an acid number from about 1 to about 3, about 3 to about 5, about 4 to about 6, or about 3 to about 7. As used herein, the phrase "acid number" refers to a colorimetric method where approximately one gram of the resin is dissolved in 50 mL of an acid number solution consisting of two parts of technical grade toluene, one part of technical grade isopropyl alcohol and a few drops of phenolphthalein indicator. The resin solution can then be titrated with 0.1 N alcoholic potassium hydroxide solution (methyl) to a slight pink color.

The hydrocarbon resin can have a degree of unsaturation corresponding to an iodine number from a low of about 120, about 125, or about 130, to a high of about 180, about 190, or about 200, as measured according to ASTM D-1959, Wijs. For example, the hydrocarbon resin can have an iodine number of about 120 to about 150, about 150 to about 180, or about 180 to about 200. In another example, the hydrocarbon resin can have a degree of unsaturation corresponding to an iodine number of at least 120, at least 125, at least 130, at least 135, at least 140, at least 145, at least 150, at least 155, at least 160, or at least 165 to a high of about 185, about 190, about 195, or about 200.

The hydrocarbon resin can have a number average molecular weight from a low of about 800, about 900, about 1,000, to a high of about 1,200, about 1,400, or about 1,600. For example, the hydrocarbon resin can have a number average molecular weight from about 800 to about 1,000, about 1,000 to about 1,200, about 1,200 to about 1,400, and about 1,400 to about 1,600. As known by those skilled in the art, resin molecular weights, e.g., weight average molecular weight, number average molecular weight, and z-average molecular weight, can be determined using Gel Permeation Chromatography (GPC). A suitable GPC method can use tetrahydrofuran as a solvent/diluent and a system of two mixed C chromatographic columns preceding a 500 Angstroms PL gel column, all available from Resin Laboratories (now part of Varian, Inc.). The column arrangement can be calibrated using a range of polystyrene standards. For determining the molecular weight of a particular resin sample, the sample can be injected along with polystyrene having a molecular weight of 250,000 and toluene as an internal standard. A Model 759A Absorbance Detector from Applied Biosystems can be used to monitor the column output and assist the molecular weight determination. The method of determining the molecular weight of a resin sample is well understood by those skilled in the art and other configurations and reference materials can conveniently be used.

Hydrocarbon resins that can be used as fluid loss additives can include those discussed and described in: THE CHEMISTRY OF ALKENES (Jacob Zabicky ed., Interscience Publishers) (1964); Rolf Mildenberg, Mechthild Zander, & Gerd Collin, HYDROCARBON RESINS (Wiley-VCH) (1997); and Kirk-Othmer, ENCYCLOPEDIA OF CHEMICAL TECHNOLOGY (Wiley-Interscience 5th ed.) (2007).

The hydrocarbon resin can be reacted with at least one ethylenically unsaturated lower aliphatic acid and/or anhydride to produce a modified hydrocarbon resin. The ethylenically unsaturated lower aliphatic acids can include, but are not limited to, maleic acid, methyltetrahydrophthalic acid, fumaric acid, glutaconic acid, citraconic acid, mesaconic acid, tetrahydrophthalic acid, methyltetrahydrophthalic acid, itaconic acid, glutaconic acid, or any mixture thereof. The ethylenically unsaturated lower aliphatic anhydrides can include, but are not limited to, maleic anhydride, tetrahydrophthalic anhydride, glutaconic anhydride, itaconic anhydride, citraconic anhydride, methyltetrahydrophthalic anhydride, or any mixture thereof. The ethylenically unsaturated lower aliphatic acid and/or anhydride can be reacted with the hydrocarbon resin in an amount from a low of about 1 part to a high of about 10 parts with remaining parts being the hydrocarbon resin. For example, about 3 to about 5 parts of the ethylenically unsaturated lower aliphatic dicarboxylic acid and/or anhydride can be reacted with about 97 to about 95 parts the hydrocarbon resin. As such, a reaction mixture of the hydrocarbon resin and the ethylenically unsaturated lower aliphatic acid and/or anhydride can include about 1 wt %, about 1.5 wt %, about 2 wt %, about 2.5 wt %, about 3 wt %, or about 3.5 wt % to about 6 wt %, about 6.5 wt %, about 7 wt %, about 7.5 wt %, about 8 wt %, about 8.5 wt %, about 9 wt %, or about 10 wt % of the ethylenically unsaturated lower aliphatic acid and/or anhydride, based on the combined weight of the hydrocarbon resin and the ethylenically unsaturated lower aliphatic acid and/or anhydride.

The reaction between the anhydride and/or acid and the hydrocarbon resin can be conducted over a wide range of temperatures depending on, at least in part, the specific dicarboxylic acid chosen and the specific hydrocarbon resin used. For example, reaction temperatures of about 180° C. to about 250° C. can be used. The reaction can be carried out in the absence of any catalyst, although a free radical initiator, such as an organic peroxide, e.g., di-tertiary butyl peroxide and/or dicumyl peroxide, can be used. When such a free radical initiator is employed, the temperature of the reaction can be from about 100° C. to about 250° C. The reaction times can be from a low of about 1 hour, about 2 hours, or about 3 hours to a high of about 8 hours, about 9 hours, or about 10 hours. For example, the reaction time can be from about 1 to about 3 hours, about 3 to about 6 hours, about 4 to about 7 hours, or about 5 to about 10 hours.

One or more solvents or diluents can be present during reaction of the anhydride and/or acid and the hydrocarbon resin. Illustrative solvents can include, but are not limited to, n-heptane, methyl cyclohexane, n-hexane, n-decane, toluene, benzene, or any mixture thereof. The solvent can be present in the reaction mixture up to about 30 wt %, based combined weight of the three components, the anhydride and/or acid, the hydrocarbon resin, and the solvent. For example, the solvent can be present in the reaction mixture from about to about 2 wt % to about 7 wt %, about 7 wt % to about 17 wt %, or about 17 wt % to about 30 wt %, based combined weight of the three components, the anhydride and/or acid, the hydrocarbon resin, and the solvent.

The reaction pressure can be sufficient to prevent substantial loss of the reaction components via evaporation. The reaction can be conducted under substantially oxygen-free conditions to prevent darkening of the color of the resulting resin. The reaction can be conducted under an inert gas blanket such as by passing nitrogen or carbon dioxide gas through the reactor vessel and over the reaction mixture. Any conventional stirred or non-stirred reactor vessel can be used. The reaction can be conducted in a batch, semicontinuous or continuous manner. A modified hydrocarbon resin can then be recovered from the reaction mixture by conventional methods such as distillation, e.g., steam distillation or stripping, or other conventional recovery methods known to those skilled in this art.

Alternatively, the modified hydrocarbon resins can be prepared by simultaneously reacting the three components and the at least one ethylenically unsaturated lower aliphatic acid or anhydride. For example, the reactants can be charged to a reaction vessel and then heated to a temperature of about 245° C. over a period of above three to about three and one-half hours. This reaction mixture can be held at a temperature of about 245° C. to about 250° C. for a period of about 16 to about 24 hours. The reactor can be allowed to cool to about 140° C. over a period of about one and one-half hours. The resulting viscous modified hydrocarbon resin can be processed, e.g., by steam distillation, to remove unreacted solvents and oils. The steam distillation can be carried out at temperatures of about 250° C.

The reaction between the at least one ethylenically unsaturated lower aliphatic acid and/or anhydride and the hydrocarbon resin can be maintained at reaction temperature until the desired acid number is reached. The modified hydrocarbon resin can have an acid number from a low of about 10, about 15, or about 20, to a high of about 30, about 35, or about 40. For example, the hydrocarbon resin can have an acid number of about 10 to about 17, about 17 to about 27, about 27 to about 32, or about 32 to about 40.

The modified hydrocarbon resin can have a Ring and Ball softening point from a low of about 110° C., about 115° C., or about 120° C., to a high of about 170° C., about 175° C., about 180° C., as measured according to ASTM E-28. For example, the modified hydrocarbon resin can have a Ring and Ball softening point of about 110° C. to about 125° C., about 125° C. to about 150° C., about 150° C. to about 165° C., or about 165° C. to about 180° C., as measured according to ASTM E-28.

The modified hydrocarbon resin can have a degree of unsaturation corresponding to an iodine number from about a low of about 120, about 125, or about 130, to a high of about 180, about 190, or about 200, as measured according to ASTM D-1959. For example, the modified hydrocarbon resin can have an iodine number of about 120 to about 150, about 150 to about 180, or about 180 to about 200, as measured according to ASTM D-1959.

The modified hydrocarbon resin can have a number average molecular weight from a low of about 800, about 900, about 1,000, to a high of about 1,200, about 1,400, or about 1,600. For example, the modified hydrocarbon resin can have a number average molecular weight from about 800 to about 1,000, about 1,000 to about 1,200, about 1,200 to about 1,400, and about 1,400 to about 1,600.

The oleaginous fluid can be or include one or more natural hydrocarbons or oils, one or more or synthetic hydrocarbons or oils, or any mixture thereof. Illustrative natural hydrocarbons or oils can include, but are not limited to, one or more diesel oils, one or more mineral oils, or any mixture thereof. Illustrative synthetic hydrocarbons or oils can be or include, but are not limited to, one or more hydrogenated olefins, one or more non-hydrogenated olefins such as poly-α-olefins, one or more linear olefins, one or more branched olefins, one or more organosiloxanes, one or more esters of fatty acids, or any mixture thereof.

The non-oleaginous fluid can be or include water. Suitable water can include, but is not limited to, river water, sea water, well water, brine, lake water, or any mixture thereof. The non-oleaginous fluid can include one or more dissolved salt ions. The dissolved salt ions can include, but are not limited to, sodium, chloride, magnesium, sulfate, calcium, or any mixture thereof. The non-oleaginous fluid can have a salt concentration from a low of about 1 wt %, about 3 wt %, about 5 wt %, about 7 wt % or 10 wt %, to a high of about 20 wt %, about 25 wt %, or about 30 wt %, based on the weight of the non-oleaginous fluid. For example, the non-oleaginous fluid can have a salt concentration of about 1 wt % to about 5 wt %, about 5 wt % to about 10 wt %, about 10 wt % to about 15 wt %, about 15 wt % to about 20 wt %, about 20 wt % to about 25 wt %, about 22 wt % to about 30 wt %, based on the weight of the non-oleaginous fluid.

Illustrative emulsifiers can include, but are not limited of, one or more fatty acids, one or more soaps of fatty acids, one or more amidoamines, one or more polyamides, one or more polyamines, one or more oleate esters such as sorbitan monoleate and/or sorbitan dioleate, one or more imidazolines, or any mixture thereof.

Illustrative additives can include, but are not limited to, one or more wetting agents, one or more viscosifiers, one or more suspending agents, one or more weighting agents, one or more acids, one or more bases, one or more pH buffers, one or more dispersants, one or more thinning agents, one or more cleaning agents, or any mixture thereof. Illustrative wetting agents can include, but are not limited to, one or more crude tall oils, one or more oxidized tall oils, one or more organic phosphate esters, one or more imidazolines, one or more amidoamines, one or more alkyl aromatic sulfates, one or more alkyl aromatic sulfates sulfonates, or any mixture thereof. FAZE-WET™, VERSACOAT™, SUREWET™, VERSAWET™, and VERSAWET™ NS are examples of commercially available wetting agents manufactured and distributed by M-I, L.L.C. (Houston, Tex.), that can be used in the drilling fluids discussed and described herein. SILWET™ L-77, L-7001, L-7605, and L-7622 are examples of commercially available wetting agents manufactured and distributed by Momentive Performance Materials Inc. (Albany, N.Y.).

Illustrative viscosifiers and/or suspending agents can include, but are not limited to, one or more organophilic clays such as amine treated clays, one or more polyamide resins, one or more polycarboxylic acid, one or more fatty acid soaps, or any mixture thereof. The amount of the viscosifier in the treated oil-based drilling fluid can vary widely. For example, the viscosifiers can be present in the treated oil-based drilling fluid in an amount from a low of about 0.01 wt %, about 0.05 wt %, about 0.1 wt %, about 0.5 wt %, or about 1 wt % to a high of about 3 wt %, about 4 wt %, 6 wt %, or about 8 wt %, based on the combined weight of the non-oleaginous fluid, the oleaginous fluid, the hydrocarbon resin, the emulsifier, and the additive. Illustrative organophilic clays can include VG-69™ and VG-PLUS™ distributed by M-I, L.L.C. (Houston, Tex.). Illustrative polyamide resins can include VERSA-HRP™, which is also manufactured and distributed by M-I, L.L.C.

Illustrative weighting agents or density materials can include, but are not limited to, galena, hematite, magnetite, iron oxides, illmenite, barite, siderite, celestite, dolomite, calcite, or any mixture thereof. The quantity of such material added, if any, depends, at least in part, on the desired density of the final composition. The weighting agent can be added to produce a drilling fluid having a density of up to about 15 pounds per gallon, about 16 pounds per gallon, about 18 pounds per gallon, about 20 pounds per gallon, about 22 pounds per gallon, or about 24 pounds per gallon.

Illustrative bases can include, but are not limited to, lime, calcium hydroxide, sodium hydroxide, potassium hydroxide, calcium oxide, calcium carbonate, sodium carbonate, sodium bicarbonate, or any mixture thereof. Illustrative acids can include, but are not limited to, hydrochloric acid, sulfuric acid, methanesulfonic acid, nitric acid, formic acid, phosphoric acid, acetic acid, or any mixture thereof. The pH of the treated oil-based drilling fluid can be from a low of about 4, about 5, or about 6, to a high of about 9, about 10, or about 11. For example, the treated oil-based drilling fluid can have a pH from about 4 to about 5, about 5 to about 6, about 6 to about 7, about 6 to about 8, about 7 to about 9, about 8 to about 10, or about 9 to about 11.

The treated oil-based drilling fluid that includes the hydrocarbon resin can have a rheology from a low of about 3, about 5, or about 7 to a high of about 15, about 17, or about 20, after hot roll at 3 rpm at a temperature of about 150° F. For example, the treated oil-based drilling fluid can have a rheology from about 4 to about 7, about 5 to about 10, about 6 to about 17, about 8 to about 15, or about 8 to about 28, after hot roll at 3 rpm at a temperature of about 150° F. The treated oil-based drilling fluid can have a rheology from a low of about 3, about 5, or about 7 to a high of about 15, about 17, about 23, about 27, or about 30, after hot roll at 6 rpm at a temperature of about 150° F. In another example, the treated oil-based drilling fluid can have a rheology from about 4 to about 7, about 5 to about 10, about 6 to about 17, about 8 to about 15, or about 6 to about 28, after hot roll at 6 rpm at a temperature of about 150° F. The treated oil-based drilling fluid can have a rheology from a low of about 45, about 50, or about 55 to a high of about 70, about 75, about 85, after hot roll at 600 rpm at a temperature of about 150° F. In another example, the treated oil-based drilling fluid can have a rheology from about 40 to about 70, about 50 to about 67, about 50 to about 70, or about 55 to about 85, after hot roll at 600 rpm at a temperature of about 150° F. The rheology can be measured according to the API Recommended Practice Standard 13B-2, Third Edition, February 1998.

The treated oil-based drilling fluid that includes the hydrocarbon resin can have a ten second gel strength from a low of about 3 lb/100 ft$^2$, about 5 lb/100 ft$^2$, or about 7 lb/100 ft$^2$ to a high of about 15 lb/100 ft$^2$, about 17 lb/100 ft$^2$, about 20 lb/100 ft$^2$, about 25 lb/100 ft$^2$, or about 30 lb/100 ft$^2$, after hot roll at a temperature of about 150° F. For example, the treated oil-based drilling fluid can have a ten second gel strength from about 4 lb/100 ft$^2$ to about 7 lb/100 ft$^2$, about 5 lb/100 ft$^2$ to about 10 lb/100 ft$^2$, about 6 lb/100 ft$^2$ to about 17 lb/100 ft$^2$, about 8 lb/100 ft$^2$ to about 15 lb/100 ft$^2$, about 14 lb/100 ft$^2$ to about 20 lb/100 ft$^2$, about 3 lb/100 ft$^2$ to about 30 lb/100 ft$^2$, or about 18 lb/100 ft$^2$ to about 28 lb/100 ft$^2$, after hot roll at a temperature of about 150° F. The gel strength can be measured according to the API Recommended Practice Standard 13B-2, Third Edition, February 1998.

The treated oil-based drilling fluid that includes the hydrocarbon resin can have a ten minute gel strength from a low of about 3 lb/100 ft$^2$, about 5 lb/100 ft$^2$, or about 7 lb/100 ft$^2$ to a high of about 15 lb/100 ft$^2$, about 17 lb/100 ft$^2$, about 20 lb/100 ft$^2$, about 25 lb/100 ft$^2$, or about 30 lb/100 ft$^2$, after hot roll at a temperature of about 150° F. For example, the treated oil-based drilling fluid can have a ten minute gel strength from about 4 lb/100 ft$^2$ to about 7 lb/100 ft$^2$, about 5 lb/100 ft$^2$ to about 10 lb/100 ft$^2$, about 6 lb/100 ft$^2$ to about 17 lb/100 ft$^2$, about 8 lb/100 ft$^2$ to about 15 lb/100 ft$^2$, about 14 lb/100 ft$^2$ to about 20 lb/100 ft$^2$, about 3 lb/100 ft$^2$ to about 30 lb/100 ft$^2$, or about 18 lb/100 ft$^2$ to about 28 lb/100 ft$^2$, after hot roll at a temperature of about 150° F.

The treated oil-based drilling fluid that includes the hydrocarbon resin can have a plastic viscosity (PV) from a low of about 15 cP, about 17 cP, or about 19 cP to a high of about 25 cP, about 27 cP, about 30 cP, after hot roll at a temperature of about 150° F. For example, the treated oil-based drilling fluid can have a plastic viscosity from about 15 cP to about 17 cP, about 5 cP to about 10 cP, about 6 cP to about 17 cP, about 8 cP to about 15 cP, about 20 cP to about 26 cP, about 15 cP to about 40 cP, or about 14 cP to about 28 cP, after hot roll at a temperature of about 150° F. The plastic viscosity can be measured according to the API Recommended Practice Standard 13B-2, Third Edition, February 1998.

The treated oil-based drilling fluid that includes the hydrocarbon resin can have a yield point (YP) from a low of about 3 lb/100 ft$^2$, about 5 lb/100 ft$^2$, or about 7 lb/100 ft$^2$ to a high of about 15 lb/100 ft$^2$, about 17 lb/100 ft$^2$, about 20 lb/100 ft$^2$, about 25 lb/100 ft$^2$, or about 30 lb/100 ft$^2$, after hot roll at a temperature of about 150° F. For example, the treated oil-based drilling fluid can have a yield point from about 4 lb/100 ft$^2$ to about 7 lb/100 ft$^2$, about 5 lb/100 ft$^2$ to about 10 lb/100 ft$^2$, about 6 lb/100 ft$^2$ to about 17 lb/100 ft$^2$, about 8 lb/100 ft$^2$ to about 15 lb/100 ft$^2$, about 8 lb/100 ft$^2$ to about 20 lb/100 ft$^2$, about 1 lb/100 ft$^2$ to about 20 lb/100 ft$^2$, or about 18 lb/100 ft$^2$ to about 28 lb/100 ft$^2$, after hot roll at a temperature of about 150° F. The yield point can be measured according to the API Recommended Practice Standard 13B-2, Third Edition, February 1998.

The treated oil-based drilling fluid that includes the hydrocarbon resin can have an electrical stability from a low of about 600 V, about 650 V, about 700 V, or about 725 V to a high of about 800 V, about 900 V, about 1,000 V, about 1,100 V, or about 1,200 V, at 150° F. For example, the treated oil-based drilling fluid can have an electrical stability of about 600 V to about 650 V, about 650 V to about 700 V, about 675 V to about 750 V, about 700 V to about 760 V, about 725 V to about 850 V, about 825 V to about 950 V, about 925 V to about 1,100 V, or about 1,000 V to about 1,200 V, at a temperature of about 150° F. In one or more embodiments, the treated oil-based drilling fluid that includes the hydrocarbon resin can have an electrical stability from a low of about 590 V, about 650 V, about 700 V, or about 725 V to a high of about 800 V, about 900 V, about 950 V, about 975 V, or about 1,050 V, at a temperature of about 150° F. and before hot rolling. For example, the treated oil-based drilling fluid can have an electrical stability of about 595 V to about 650 V, about 625 V to about 705 V, about 675 V to about 835 V, about 800 V to about 950 V, about 925 V to about 1,000 V, about or 975 V to about 1,100 V, at a temperature of about 150° F. and before hot rolling. In one or more embodiments, the treated oil-based drilling fluid that includes the hydrocarbon resin can have an electrical stability from a low of about 800 V, about 850 V, about 900 V, or about 950 V to a high of about 1,000 V, about 1,050 V, about 1,100 V, about 1,150 V, about 1,200 V, about 1,250, or about 1,300 V, at a temperature of about 150° F. and after hot rolling. For example, the treated oil-based drilling fluid can have an electrical stability of about 830 V to about 975 V, about 1,025 V to about 1,115 V, about 1,075 V to about 1,190 V, about 1,150 V to about 1,250 V, about 940 V to about 1,080 V, or about or 1,090 V to about 1,240 V, at a temperature of about 150° F. and after hot rolling. The electrical stability can be measured according to the API Recommended Practice Standard 13B-2, Third Edition, February 1998.

In one or more embodiments, the treated oil-based drilling fluid that includes the hydrocarbon resin can have a high temperature/high pressure fluid loss from a low of about 5 mL, about 6 mL, or about 7 mL to a high of about 10 mL, about 12 mL, about 14 mL, after hot roll at 150° F. For example, the treated oil-based drilling fluid can have a high temperature/high pressure fluid loss of about 4 mL to about 7 mL, about 5 mL to about 10 mL, about 6 mL to about 11 mL, or about 8 mL to about 14 mL, after hot roll at a temperature of about 150° F. In one or more embodiments, the treated oil-based drilling fluid that includes the hydrocarbon resin can have a high temperature/high pressure fluid loss from a low of about 0.5 mL, about 1 mL, about 2 mL, about 3 mL, about 5 mL, or about 7 mL to a high of about 10 mL, about 14 mL, about 18 mL, about 22 mL, about 26 mL, or about 30 mL, at a temperature of about 250° F. after hot roll at a temperature of about 150° F. For example, the treated oil-based drilling fluid can have a high temperature/high pressure fluid loss of about 1 mL to about 6 mL, about 3 mL to about 10 mL, about 6 mL to about 17 mL, about 1 mL to about 8.5 mL, or about 10 mL to about 27 mL, at a temperature of 250° F. after hot roll at a temperature of about 150° F. In another example, the treated oil-based drilling fluid can have a high temperature/high pressure fluid loss of less than 20 mL, less than 15 mL, less than 10 mL, less than 9 mL, less than 8.5 mL, less than 8 mL, less than 7 mL, less than 6 mL, less than 5 mL, less than 4 mL, or less than 3 mL, at a temperature of 250° F. after hot roll at a temperature of about 150° F. The high temperature/high pressure fluid loss can be measured according to the API Recommended Practice Standard 13B-2, Third Edition, February 1998.

In one or more embodiments, the treated oil-based drilling fluid can have a water break-through from a low of about 0 mL, about 0.1 mL, about 0.3 mL, or about 0.5 mL to a high of about 1 mL, about 3 mL, about 5 mL, after hot roll at a temperature of about 150° F. For example, the treated oil-based drilling fluid can have a water break-through of about 0 mL to about 0.3 mL, about 0.1 mL to about 0.5 mL, about 0.2 mL to about 1.3 mL, about 0.5 mL to about 2 mL, about 1 mL to about 3 mL, or about 0.8 mL to about 3.6 mL, after hot roll at a temperature of about 150° F. In one or more embodiments, the treated oil-based drilling fluid can have a water break-through from a low of about 5 mL, about 6 mL, or about 7 mL to a high of about 10 mL, about 12 mL, about 14 mL, after hot roll at a temperature of about 150° F. For example, the treated oil-based drilling fluid can have a water break-through from about 4 mL to about 7 mL, about 5 mL to about 10 mL, about 6 mL to about 11 mL, or about 8 mL to about 14 mL, after hot roll at a temperature of about 150° F. In another example, the treated oil-based drilling fluid can have a water break-through of 5 mL or less, 4 mL or less, 3 mL or less, 2 mL or less, 1 mL or less, 0.7 mL or less, 0.5 mL or less, or 0.3 mL or less, after hot roll at a temperature of about 150° F. The water break-through can be measured according to the API Recommended Practice Standard 13B-2, Third Edition, February 1998.

The treated oil-based drilling fluid can include the non-oleaginous fluid in an amount of less than 75 wt %, less than 70 wt %, less than 65 wt %, less than 60 wt %, less than 55 wt %, or less than 50 wt %, based on a combined weight of the non-oleaginous fluid, the oleaginous fluid, the hydrocarbon resin, the emulsifier, and the additive. For example, the amount of the non-oleaginous fluid in the treated oil-based drilling fluid can be from a low of about 1 wt %, about 5 wt %, about 10 wt %, about 15 wt %, about 20 wt %, about 25 wt %, about 30 wt %, about 35 wt %, or about 40 wt % to a high of about 50 wt %, about 55 wt %, about 60 wt %, about 65 wt %, or about 70 wt %, based on the combined weight of the non-oleaginous fluid, the oleaginous fluid, the hydrocarbon resin, the emulsifier, and the additive. In another example, the amount of non-oleaginous fluid in the treated oil-based drilling fluid can be from about 1 wt % to about 10 wt %, about 5 wt % to about 25 wt %, about 10 wt % to about 30 wt %, about 20 wt % to about 50 wt %, about 30 wt % to about 60 wt %, about 40 wt % to about 60 wt %, about 35 wt % to about 55 wt %, about 50 wt % to about 70 wt %, or about 55 wt % to about 65 wt %, based on the combined weight of the non-oleaginous fluid, the oleaginous fluid, the hydrocarbon resin, the emulsifier, and the additive.

The treated oil-based drilling fluid can include the oleaginous fluid in an amount of less than 75 wt %, less than 70 wt %, less than 65 wt %, less than 60 wt %, less than 55 wt %, or less than 50 wt %, based on a combined weight of the non-oleaginous fluid, the oleaginous fluid, the hydrocarbon resin, the emulsifier, and the additive. For example, the amount of the oleaginous fluid in the treated oil-based drilling fluid can be from a low of about 1 wt %, about 5 wt %, about 10 wt %, about 15 wt %, about 20 wt %, about 25 wt %, about 30 wt %, or about 35 wt % to a high of about 50 wt %, about 55 wt %, about 60 wt %, about 65 wt %, about 70 wt %, or about 75 wt %, based on the combined weight of the non-oleaginous fluid, the oleaginous fluid, the hydrocarbon resin, the emulsifier, and the additive. In another example, the amount of the oleaginous fluid in the treated oil-based drilling fluid can be from about 1 wt % to about 10 wt %, about 5 wt % to about 20 wt %, about 10 wt % to about 30 wt %, about 15 wt % to about 40 wt %, about 20 wt % to about 50 wt %, about 30 wt % to about 45 wt %, about 40 wt % to about 60 wt %, about 50 wt % to about 70 wt %, or about 55 wt % to about 65 wt %, based on the combined weight of the non-oleaginous fluid, the oleaginous fluid, the hydrocarbon resin, the emulsifier, and the additive.

The treated oil-based drilling fluid can include the hydrocarbon resin in an amount from a low of about 0.01 wt %, about 0.05 wt %, about 0.1 wt %, about 0.5 wt %, about 1 wt %, about 1.5 wt %, about 2 wt %, about 2.5 wt %, or about 2 wt % to a high of about 5 wt %, about 7 wt %, about 9 wt %, or about 10 wt %, based on the combined weight of the non-oleaginous fluid, the oleaginous fluid, the hydrocarbon resin, the emulsifier, and the additive. In another example, the amount of the hydrocarbon resin in the treated oil-based drilling fluid can be from about 0.01 wt % to about 0.1 wt %, about 0.05 wt % to about 2.5 wt %, about 0.5 wt % to about 1 wt %, about 1 wt % to about 2 wt %, about 1.5 wt % to about 4.5 wt %, about 2 wt % to about 5 wt %, about 3 wt % to about 6 wt %, about 4 wt % to about 7 wt %, or about 5 wt % to about 10 wt %, based on the combined weight of the non-oleaginous fluid, the oleaginous fluid, the hydrocarbon resin, the emulsifier, and the additive. In another example, the amount of the hydrocarbon resin used in the treated oil-based drilling fluid can be about 1 pound per barrel of drilling fluid to about 20 pounds per barrel of drilling fluid, about 3 pounds per barrel of drilling fluid to about 16 pounds per barrel of drilling fluid, or about 6 pounds per barrel of drilling fluid to about 12 pounds per barrel of drilling fluid, based on the total weight of a barrel of the treated oil-based drilling fluid. In another example, the amount of the hydrocarbon resin in the treated oil-based drilling fluid can be less than 10 wt %, less than 7 wt %, less than 5 wt %, less than 4 wt %, less than 3 wt %, or less than 2 wt %, based on the combined weight of the non-oleaginous fluid, the oleaginous fluid, the hydrocarbon resin, the emulsifier, and the additive.

The treated oil-based drilling fluid can include the emulsifier in an amount from a low of about 0.01 wt %, about 0.05 wt %, about 0.1 wt %, about 0.5 wt %, about 1 wt %, about 1.5 wt %, about 2 wt %, about 2.5 wt %, or about 3 wt % to a high of about 4 wt %, about 5 wt %, about 7 wt %, or about 8 wt %, based on the combined weight of the non-oleaginous fluid, the oleaginous fluid, the hydrocarbon resin, the emulsifier, and the additive. In another example, the amount of the hydrocarbon resin in the treated oil-based drilling fluid can be from about 0.01 wt % to about 0.1 wt %, about 0.05 wt % to about 2.5 wt %, about 0.5 wt % to about 1 wt %, about 1 wt % to about 2 wt %, about 1.5 wt % to about 3 wt %, about 2 wt % to about 5 wt %, about 4 wt % to about 6 wt %, or about 5 wt % to about 8 wt %, based on the combined weight of the non-oleaginous fluid, the oleaginous fluid, the hydrocarbon resin, the emulsifier, and the additive. In another example, the amount of the emulsifier in the treated oil-based drilling fluid can be less than 8 wt %, less than 6 wt %, less than 5 wt %, less than 3 wt %, less than 2 wt %, or less than 1 wt %, based on the combined weight of the non-oleaginous fluid, the oleaginous fluid, the hydrocarbon resin, the emulsifier, and the additive.

The treated oil-based drilling fluid can include the additive in an amount from a low of about 1 wt %, about 3 wt %, about 5 wt %, or about 7 wt % to a high of about 10 wt %, about 15 wt %, or about 20 wt %, based on the combined weight of the non-oleaginous fluid, the oleaginous fluid, the hydrocarbon resin, the emulsifier, and the additive. In another example, the amount of the additive in the treated oil-based drilling fluid can be from about 1 wt % to about 3 wt %, about 0.5 wt % to about 4 wt %, about 3 wt % to about 10 wt %, about 5 wt % to about 7 wt %, about 7 wt % to about 15 wt %, or about 10 wt % to about 20 wt %, based on the combined weight of the non-oleaginous fluid, the oleaginous fluid, the hydrocarbon resin, the emulsifier, and the additive. In another example, the amount of the additive in the treated oil-based drilling fluid can be less than 20 wt %, less than 15 wt %, less than 10 wt %, or less than 7 wt %, based on the combined weight of the non-oleaginous fluid, the oleaginous fluid, the hydrocarbon resin, the emulsifier, and the additive.

Drilling a subterranean formation can include drilling the subterranean formation using the treated oil-based drilling fluid. For example, the treated oil-based drilling fluid can be pumped down to the bottom of the well through a drill pipe where the treated oil-based drilling fluid emerges through ports in the drilling bit. The treated oil-based drilling fluid can be used in any kind of drilling operation. For example, the treated oil-based drilling fluid can be used in vertical drilling, extended reach drilling, and directional drilling. Specific treated oil-based drilling fluid compositions can depend on the state of drilling a well at a particular time, depending on the depth and/or the make-up of the subterranean formation. The treated oil-based drilling fluid can be adapted to conditions of high temperature and pressure, such as those encountered in deep wells.

Examples

In order to provide a better understanding of the foregoing discussion, the following non-limiting examples are offered. Although the examples are directed to specific embodiments, they are not to be viewed as limiting the invention in any specific respect.

The performance of four inventive fluid loss additives (Ex. 1-Ex4) were evaluated by comparing to a comparative example (CEx.) that had no fluid loss additive. The Ex. 1 drilling fluid used a hydrocarbon resin modified with 25% maleated rosin as the fluid loss additive. The Ex. 2 drilling fluid used a hydrocarbon resin modified with maleic anhydride as the fluid loss additive. The Ex. 3 drilling fluid used a hydrocarbon resin modified with maleated tall oil rosin as the fluid loss additive. The Ex. 4 drilling fluid used a hydrocarbon resin modified with tall oil fatty acids as the fluid loss additive. The emulsifier for all examples was a tall oil fatty acid-based emulsifier. The drilling fluids were prepared by combining the ingredients in a Hamilton Beach mixer and shearing the mixture for 5 minutes at 6,000 rpm on a Silverson high shear mixer. The compositions for the comparative drilling fluid and the inventive drilling fluids are shown in Table 1.

TABLE 1

Drilling Fluid Compositions

|  | CEx. | Ex. 1 | Ex. 2 | Ex. 3 | Ex. 4 |
|---|---|---|---|---|---|
| #2 Diesel (g) | 180.5 | 180.5 | 180.5 | 180.5 | 180.5 |
| Organophilic Clay (g) | 5 | 5 | 5 | 5 | 5 |
| Lime (g) | 5 | 5 | 5 | 5 | 5 |
| Emulsifier (g) | 5 | 5 | 5 | 5 | 5 |
| 25 wt % $CaCl_2$ (aq) (g) | 71.5 | 71.5 | 71.5 | 71.5 | 71.5 |
| Barite (g) | 280 | 280 | 280 | 280 | 280 |
| FLA (g) | 0 | 3.5 | 3.5 | 3.5 | 3.5 |

The before hot roll (BHR) rheology, plastic viscosity (PV), yield point (YP), electrical stability (ES), ten second gel strength (10"), and ten minute gel strength (10') were measured for all examples. The drilling fluids were then hot rolled for 16 hours at 150° F. The after hot roll (AHR) rheology, plastic viscosity, yield point, electrical stability, ten second gel strength, and ten minute gel strength were measured. All testing on the drilling fluids were conducted according to the API Recommended Practice Standard 13B-2, Third Edition, February 1998. Table 2 shows the results for the rheology tests.

TABLE 2

Rheology Properties for Drilling Fluids

|  | CEx. | | Ex. 1 | | Ex. 2 | | Ex. 3 | | Ex. 4 | |
|---|---|---|---|---|---|---|---|---|---|---|
| Rheology | BHR 150° F. | AHR 150° F. | BHR 150° F. | AHR 150° F. | BHR 150° F. | AHR 150° F. | BHR 150° F. | AHR 150° F. | BHR 150° F. | AHR 150° F. |
| 600 rpm | 44 | 54 | 72 | 56 | 80 | 68 | 47 | 42 | 50 | 55 |
| 300 rpm | 25 | 33 | 39 | 34 | 43 | 42 | 27 | 22 | 28 | 31 |
| 200 rpm | 17 | 24 | 27 | 26 | 30 | 33 | 19 | 14 | 20 | 23 |
| 100 rpm | 12 | 16 | 17 | 18 | 17 | 24 | 13 | 8 | 14 | 15 |
| 6 rpm | 6 | 10 | 9 | 10 | 5 | 15 | 6 | 3 | 7 | 8 |
| 3 rpm | 6 | 9 | 9 | 10 | 5 | 15 | 6 | 3 | 6 | 7 |
| PV | 19 | 21 | 33 | 22 | 37 | 26 | 20 | 20 | 22 | 24 |
| YP | 6 | 12 | 6 | 12 | 6 | 16 | 7 | 2 | 6 | 7 |
| 10" Gel | 7 | 10 | 14 | 11 | 9 | 20 | 8 | 5 | 8 | 9 |
| 10' Gel | 7 | 12 | 27 | 13 | 21 | 20 | 8 | 14 | 8 | 14 |

As shown in Table 2, the drilling fluid of Ex. 3 provided a rheology profile very similar to the comparative drilling fluid. Although the yield point for Ex. 3 was slightly lower after hot rolling the gel strengths were also very similar. The electrical stability test is an indication of the quality of the invert emulsion. Table 3 shows the results of the electrical stability test.

TABLE 3

Electrical Stability for Drilling Fluids

|  | CEx. | | Ex. 1 | | Ex. 2 | | Ex. 3 | | Ex. 4 | |
|---|---|---|---|---|---|---|---|---|---|---|
|  | BHR 150° F. | AHR 150° F. | BHR 150° F. | AHR 150° F. | BHR 150° F. | AHR 150° F. | BHR 150° F. | AHR 150° F. | BHR 150° F. | AHR 150° F. |
| ES (Volts at 150° F.) | 916 | 1,087 | 992 | 1,235 | 833 | 1,112 | 595 | 832 | 703 | 1,090 |

The high temperature/high pressure (HTHP) fluid loss was conducted with a 500 psi differential pressure between the top and the bottom of the HTHP cell. The HTHP fluid loss tests were performed after hot rolling at a 150° F. The fluid loss tests were performed at 250° F. The results of the high temperature/high pressure fluid loss are shown in Table 4. It can be seen from the data given in Table 4 that the Ex. 3 treated oil-based drilling fluid produced the lowest fluid loss compared to the other treated oil-based drilling fluids and the comparative drilling fluid.

TABLE 4

High Temperature/High Pressure and Water Break-Through for Drilling Fluids

|  | CEx. AHR 150° F. | Ex. 1 AHR 150° F. | Ex. 2 AHR 150° F. | Ex. 3 AHR 150° F. | Ex. 4 AHR 150° F. |
|---|---|---|---|---|---|
| HT/HP Fluid Loss at 250° F. (mL) | 9 | 27 | 20 | 3 | 8 |
| Water Break-Through (mL) | 0 | 1 | 0.2 | 0 | 0 |
| Filter Cake Size (cm) | 1.2 | 1.4 | 1.5 | 1 | 1.1 |

Embodiments of the present disclosure further relate to any one or more of the following paragraphs:

1. A method for treating an oil-based drilling fluid, comprising: combining an oil-based drilling fluid and a hydrocarbon resin to produce a treated oil-based drilling fluid, wherein the hydrocarbon resin comprises a polymerized product of a reaction mixture, and wherein the reaction mixture comprises: a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof;

and at least one member selected from the group consisting of: a fatty acid-containing material, a rosin acid-containing material, and a mixture thereof.

2. A method for treating an oil-based drilling fluid, comprising: combining an oil-based drilling fluid and a hydrocarbon resin to produce a treated oil-based drilling fluid, wherein the hydrocarbon resin comprises a polymerized product of a reaction mixture, and wherein the reaction mixture comprises: a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof.

3. A method for treating an oil-based drilling fluid, comprising: combining an oil-based drilling fluid and a hydrocarbon resin to produce a treated oil-based drilling fluid, wherein the hydrocarbon resin comprises a polymerized product of a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

4. A method for treating an oil-based drilling fluid, comprising: combining an oil-based drilling fluid and a hydrocarbon resin to produce a treated oil-based drilling fluid, wherein the hydrocarbon resin comprises a polymerized product of a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefin, or a polyene, each having more than five carbon atoms and no aromatic rings, a $C_5$-olefin, a debutanized aromatic concentrate, and any mixture thereof.

5. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, the hydrocarbon resin comprising a polymerized product of a reaction mixture, the reaction mixture comprising: a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

6. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, the hydrocarbon resin comprising a polymerized product of a reaction mixture, the reaction mixture comprising: a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof.

7. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, the hydrocarbon resin comprising a polymerized product of a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

8. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, the hydrocarbon resin comprising a polymerized product of a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof.

9. A method for treating a subterranean formation comprising: combining an oil-based drilling fluid with a reaction product of at least one ethylenically unsaturated lower aliphatic dicarboxylic acid or anhydride and a hydrocarbon resin comprising a polymerized product of a reaction mixture to produce a treated oil-based drilling fluid, wherein the reaction mixture comprises: a dicyclopentadiene; at least one member selected from the group consisting of: a dimer of an aliphatic cyclic diene having five carbon atoms, a dimer of a non-cyclic diene having five carbon atoms, a monoolefin, a diolefin, or a polyene, each having more than five carbon atoms and having no aromatic rings, a $C_5$-olefin, and a debutanized aromatic concentrate, and any mixture thereof; and at least one member selected from the group consisting of: a fatty acid-containing material, a rosin acid-containing material, and a mixture thereof; and introducing the treated oil-based drilling fluid to a wellbore.

10. A method for treating a subterranean formation comprising: combining an oil-based drilling fluid with a reaction product of at least one ethylenically unsaturated lower aliphatic dicarboxylic acid or anhydride and a hydrocarbon resin comprising a polymerized product of a reaction mixture to produce a treated oil-based drilling fluid, wherein the reaction mixture comprises: a dicyclopentadiene and at least one member selected from the group consisting of: a dimer of an aliphatic cyclic diene having five carbon atoms, a dimer of a non-cyclic diene having five carbon atoms, a monoolefin, a diolefin, or a polyene, each having more than five carbon atoms and having no aromatic rings, a $C_5$-olefin, a debutanized aromatic concentrate, and any mixture thereof; and introducing the treated oil-based drilling fluid to a wellbore.

11. A method for treating a subterranean formation comprising: combining an oil-based drilling fluid with a reaction product of at least one ethylenically unsaturated lower aliphatic dicarboxylic acid or anhydride and a hydrocarbon resin to produce a treated oil-based drilling fluid, wherein the hydrocarbon resin comprises a polymerized product of a dicyclopentadiene; at least one member selected from the group consisting of: a dimer of an aliphatic cyclic diene having five carbon atoms, a dimer of a non-cyclic diene having five carbon atoms, a monoolefin, a diolefin, or a polyene, each having more than five carbon atoms and having no aromatic rings, a $C_5$-olefin, and a debutanized aromatic concentrate, and any mixture thereof; and at least one member selected from the group consisting of: a fatty acid-containing material, a rosin acid-containing material, and a mixture thereof; and introducing the treated oil-based drilling fluid to a wellbore.

12. A method for treating a subterranean formation comprising: combining an oil-based drilling fluid with a reaction product of at least one ethylenically unsaturated lower aliphatic dicarboxylic acid or anhydride and a hydrocarbon resin to produce a treated oil-based drilling fluid, wherein the hydrocarbon resin comprises a polymerized product of a dicyclopentadiene and at least one member selected from the group consisting of: a dimer of an aliphatic cyclic diene having five carbon atoms, a dimer of a non-cyclic diene having five carbon atoms, a monoolefin, a diolefin, or a polyene, each having more than five carbon atoms and having no aromatic rings, a $C_5$-olefin, a debutanized aromatic concentrate, and any mixture thereof; and introducing the treated oil-based drilling fluid to a wellbore.

13. The method according to any one of paragraphs 1, 2, 5, 6, 9, or 10, wherein the reaction mixture comprises the dimer of the aliphatic cyclic diene, the dimer of the aliphatic non-cyclic diene, or both.

14. The method according to any one of paragraphs 1, 2, 5, 6, 9, 10, or 13 wherein the reaction mixture comprises at least one of the monoolefin, the diolefin, and the polyene.

15. The method according to any one of paragraphs 1, 2, 5, 6, 9, 10, 13, or 14, wherein the reaction mixture comprises the $C_5$-olefin.

16. The method according to any one of paragraphs 1, 2, 5, 6, 9, 10, or 13 to 15, wherein the reaction mixture comprises the debutanized aromatic concentrate.

17. The method according to any one of paragraphs 5 to 16, wherein the at least one ethylenically unsaturated lower aliphatic dicarboxylic acid or anhydride comprises maleic acid, maleic anhydride, or a mixture thereof.

18. The method according to any one of paragraphs 1 to 17, wherein the treated oil-based drilling fluid has a high temperature high pressure fluid loss at 250° F. of about 3 mL to about 7 mL, as measure by the API Recommended Practice Standard 13B-2, Third Edition, February 1998.

19. The method according to any one of paragraphs 1 to 18, wherein the treated oil-based drilling fluid has a high temperature high pressure fluid loss at 250° F. of 0 to about 1 mL, as measure by the API Recommended Practice Standard 13B-2, Third Edition, February 1998.

20. The method according to any one of paragraphs 1, 3, 5, 7, 9, 11, or 13 to 19, wherein the hydrocarbon resin comprises the fatty acid-containing materials.

21. The method according to any one of paragraphs 1, 3, 5, 7, 9, 11, or 13 to 20, wherein the hydrocarbon resin comprises the rosin acid-containing materials.

22. The method according to any one of paragraphs 1, 3, 5, 7, 9, 11, or 13 to 21, wherein the fatty acid-containing materials comprise vegetable acids, vegetable oils, animal acids, animal oils, fish acids, fish oils, tall oil, crude tall oil, distilled tall oil, tall oil fatty acids, fatty acids modified by reaction with $\alpha,\beta$ unsaturated carboxylic acids or acid anhydrides, and mixtures thereof.

23. The method according to any one of paragraphs 1 to 22, wherein the oil-based drilling fluid comprises one or more oleaginous fluids, one or more non-oleaginous fluids, one or more emulsifiers, and one or more additives.

24. The method according to paragraph 23, wherein the one or more additives comprise one or more wetting agents, one or more viscosifiers, one or more suspending agents, one or more weighting agents, one or more acids, one or more bases, one or more pH buffers, one or more dispersants, one or more thinning agents, one or more cleaning agents, or any mixture thereof.

25. The method according to paragraphs 23 or 24, wherein the one or more oleaginous fluids comprise one or more natural oils, one or more or synthetic oils, or any mixture thereof.

26. The method according to any one of paragraphs 23 to 25, wherein the one or more non-oleaginous fluids comprise water.

27. The method according to any one of paragraphs 23 to 26, wherein the one or more emulsifiers comprise one or more fatty acids, one or more soaps of fatty acids, one or more amidoamines, one or more polyamides, one or more polyamines, one or more oleate esters, one or more imidazolines, or any mixture thereof.

28. The method according to any one of paragraphs 1 to 27, wherein the treated oil-based drilling fluid has a high temperature high pressure fluid loss, after at 250° F. of about 3 mL to about 7 mL, as measure by the API Recommended Practice Standard 13B-2, Third Edition, February 1998.

29. The method according to any one of paragraphs 23 to 28, wherein the treated oil-based drilling fluid comprises about 1 wt % to about 75 wt % of the non-oleaginous fluid, based on the combined weight of the non-oleaginous fluid, the oleaginous fluid, the hydrocarbon resin, the emulsifier, and the additive.

30. The method according to any one of paragraphs 23 to 29, wherein the treated oil-based drilling fluid comprises about 1 wt % to about 75 wt % of the oleaginous fluid, based on the combined weight of the non-oleaginous fluid, the oleaginous fluid, the hydrocarbon resin, the emulsifier, and the additive.

31. The method according to any one of paragraphs 23 to 30, wherein the treated oil-based drilling fluid comprises about 0.01 wt % to about 10 wt % of the hydrocarbon resin, based on the combined weight of the non-oleaginous fluid, the oleaginous fluid, the hydrocarbon resin, the emulsifier, and the additive.

32. The method according to any one of paragraphs 23 to 31, wherein the treated oil-based drilling fluid comprises about 0.01 wt % to about 8 wt % of the emulsifier, based on the combined weight of the non-oleaginous fluid, the oleaginous fluid, the hydrocarbon resin, the emulsifier, and the additive.

33. The method according to any one of paragraphs 23 to 32, wherein the treated oil-based drilling fluid comprises about 1 wt % to about 20 wt % of the additive, based on the combined weight of the non-oleaginous fluid, the oleaginous fluid, the hydrocarbon resin, the emulsifier, and the additive.

34. The method according to any one of paragraphs 1 to 33, wherein the treated oil-based drilling fluid has an electrical stability of about 600 V to about 1,200 V at a temperature of about 150° F.

35. The method according to any one of paragraphs 1 to 34, wherein the treated oil-based drilling fluid has an electrical stability of about 600 V to about 1,200 V at a temperature of about 150° F. after hot roll at a temperature of about 250° F., as measured according to the API Recommended Practice Standard 13B-2, Third Edition, February 1998.

36. The method according to any one of paragraphs 1 to 35, wherein the treated oil-based drilling fluid has a water break-through of 1 mL or less, as measured according to the API Recommended Practice Standard 13B-2, Third Edition, February 1998.

37. The method according to any one of paragraphs 1 to 36, wherein the treated oil-based drilling fluid has a high temperature/high pressure fluid loss of less than 30 mL at a temperature of about 250° F. after hot roll at a temperature of about 150° F., as measured according to the API Recommended Practice Standard 13B-2, Third Edition, February 1998.

38. The method according to any one of paragraphs 1 to 37, wherein the treated oil-based drilling fluid has a high temperature/high pressure fluid loss of less than 8.5 mL at a temperature of about 250° F. after hot roll at a temperature of about 150° F., as measured according to the API Recommended Practice Standard 13B-2, Third Edition, February 1998.

39. The method according to any one of paragraphs 1 to 38, wherein the treated oil-based drilling fluid has a high temperature/high pressure fluid loss of less than 5 mL at a temperature of about 250° F. after hot roll at a temperature of about 150° F., as measured according to the API Recommended Practice Standard 13B-2, Third Edition, February 1998.

40. The method according to any one of paragraphs 1 to 39, wherein the treated oil-based drilling fluid has a high temperature/high pressure fluid loss of about 1 mL to about 8.5 mL at a temperature of about 250° F. after hot roll at a temperature of about 150° F., as measured according to the API Recommended Practice Standard 13B-2, Third Edition, February 1998.

41. The method according to any one of paragraphs 1 to 40, wherein the treated oil-based drilling fluid has a ten second gel strength of about 3 lb/100 ft$^2$ to about 30 lb/100 ft$^2$, after hot roll at a temperature of about 150° F., as measured according to the API Recommended Practice Standard 13B-2, Third Edition, February 1998.

42. The method according to any one of paragraphs 1 to 41, wherein the treated oil-based drilling fluid has a ten minute gel strength of about 3 lb/100 ft$^2$ to about 30 lb/100 ft$^2$, after hot roll at a temperature of about 150° F., as measured according to the API Recommended Practice Standard 13B-2, Third Edition, February 1998.

43. The method according to any one of paragraphs 1 to 42, wherein the treated oil-based drilling fluid has a plastic viscosity of about 15 cP to about 40 cP, after hot roll at a temperature of about 150° F., as measured according to the API Recommended Practice Standard 13B-2, Third Edition, February 1998.

44. The method according to any one of paragraphs 1 to 43, wherein the treated oil-based drilling fluid has a yield point of about 1 lb/100 ft$^2$ to about 20 lb/100 ft$^2$, after hot roll at a temperature of about 150° F., as measured according to the API Recommended Practice Standard 13B-2, Third Edition, February 1998.

45. The method according to any one of paragraphs 1 to 44, wherein the hydrocarbon resin has a Ring and Ball softening point of about 110° C. to about 180° C., as measured according to ASTM E-28.

46. The method according to any one of paragraphs 1 to 45, wherein the hydrocarbon resin has an acid number of about 10 to about 40.

47. The method according to any one of paragraphs 1 to 46, wherein the hydrocarbon resin has a degree of unsaturation corresponding to an iodine number of about 120 to about 200, as measured according to ASTM D-1959.

48. The method according to any one of paragraphs 1 to 47, wherein the debutanized aromatic concentrate comprises toluene, one or more xylenes, styrene, 5-methyl-bicyclohept-2-ene, 6-methylene-5-methyl-bicyclohept-2-ene, or any mixture thereof.

49. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, wherein the at least one ethylenically unsaturated lower aliphatic dicarboxylic acid or anhydride comprises maleic acid or maleic anhydride, and wherein the hydrocarbon resin comprises a polymerized product of a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

50. A method for treating an oil-based drilling fluid, comprising: combining an oil-based drilling fluid and a reaction product of at least one ethylenically unsaturated lower aliphatic dicarboxylic acid or anhydride and a hydrocarbon resin to produce a treated oil-based drilling fluid, wherein the at least one ethylenically unsaturated lower aliphatic dicarboxylic acid or anhydride comprises maleic acid or maleic anhydride, and wherein the hydrocarbon resin comprises a polymerized product of a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof.

51. The method according to paragraph 49 or 50, wherein the oil-based drilling fluid comprises one or more oleaginous fluids, one or more non-oleaginous fluids, one or more emulsifiers, and one or more additives.

52. The method according to paragraph 51, wherein the one or more oleaginous fluids comprise one or more natural oils, one or more or synthetic oils, or any mixture thereof, wherein the one or more non-oleaginous fluids comprise water, wherein the one or more emulsifiers comprise one or more fatty acids, one or more soaps of fatty acids, one or more amidoamines, one or more polyamides, one or more polyamines, one or more oleate esters, one or more imidazolines, or any mixture thereof, and wherein the one or more additives comprise one or more wetting agents, one or more viscosifiers, one or more suspending agents, one or more weighting agents, one or more acids, one or more bases, one or more pH buffers, one or more dispersants, one or more thinning agents, one or more cleaning agents, or any mixture thereof.

53. The method according to paragraph 51 or 52, wherein the treated oil-based drilling fluid comprises about 1 wt % to about 75 wt % of the non-oleaginous fluid, about 1 wt % to about 75 wt % of the oleaginous fluid, about 0.01 wt % to about 10 wt % of the hydrocarbon resin, about 0.01 wt % to about 8 wt % of the emulsifier, and about 1 wt % to about 20 wt % of the additive, and wherein all weight percent values are based on the combined weight of the non-oleaginous fluid, the oleaginous fluid, the hydrocarbon resin, the emulsifier, and the additive.

54. A modified hydrocarbon resin, comprising: a reaction product of at least one ethylenically unsaturated lower aliphatic dicarboxylic acid or anhydride and a hydrocarbon resin, wherein the hydrocarbon resin comprises a polymerized product of a dicyclopentadiene; at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof; and at least one member selected from the group consisting of: a fatty acid-containing material, a rosin acid-containing material, and a mixture thereof.

55. A modified hydrocarbon resin, comprising: a reaction product of at least one ethylenically unsaturated lower aliphatic dicarboxylic acid or anhydride and a hydrocarbon resin, wherein the hydrocarbon resin comprises a polymerized product of a dicyclopentadiene and at least one member selected from the group consisting of: a dimer of an aliphatic cyclic diene having five carbon atoms, a dimer of an aliphatic non-cyclic diene having five carbon atoms, a monoolefin, a diolefins, or a polyene, each having more than five carbon atoms and no aromatic rings, a $C_5$-olefin, a debutanized aromatic concentrate, and any mixture thereof.

56. The modified hydrocarbon resin according to paragraph 54 or 55, wherein the ethylenically unsaturated lower aliphatic dicarboxylic acid is present, and wherein the ethylenically unsaturated lower aliphatic dicarboxylic acid comprises maleic acid, methyltetrahydrophthalic acid, fumaric acid, glutaconic acid, citraconic acid, mesaconic acid, tetrahydrophthalic acid, methyltetrahydrophthalic acid, itaconic acid, glutaconic acid, or any mixture thereof.

57. The modified hydrocarbon resin according to any one of paragraphs 54 to 56, wherein the ethylenically unsaturated lower aliphatic anhydride is present, and wherein the ethylenically unsaturated lower aliphatic anhydride comprises maleic anhydride, tetrahydrophthalic anhydride, glutaconic anhydride, itaconic anhydride, citraconic anhydride, methyltetrahydrophthalic anhydride, or any mixture thereof.

58. The modified hydrocarbon resin according to paragraph 54 or 55, wherein the at least one ethylenically unsaturated lower aliphatic dicarboxylic acid or anhydride comprises maleic acid or maleic anhydride.

59. The method or modified hydrocarbon resin according to any one of paragraphs 1, 3, 5, 7, 9, 11, 13 to 49, 51 to 54, or 56 to 58, wherein the fatty acid-containing material, comprises crude tall oil, distilled tall oil (DTO), tall oil fatty acids (TOFA), tall oil pitch, or any mixture thereof.

60. The method or modified hydrocarbon resin according to any one of paragraphs 1, 3, 5, 7, 9, 11, 13 to 49, 51 to 54, or 56 to 59, wherein the rosin acid-containing material comprises tall oil rosin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for making a drilling fluid mixture, comprising:
combining an oil-based drilling fluid and a reaction product of at least one ethylenically unsaturated lower aliphatic dicarboxylic acid or anhydride and a hydrocarbon resin to produce a drilling fluid mixture, wherein the drilling fluid mixture is an emulsion, a suspension, or a dispersion, and wherein the hydrocarbon resin comprises a polymerized product of a reaction mixture comprising:
a dicyclopentadiene;
at least one member selected from the group consisting of:
a dimer of an aliphatic cyclic diene having five carbon atoms,
a dimer of an aliphatic non-cyclic diene having five carbon atoms,
a monoolefin, a diolefin, or a polyene, each having more than five carbon atoms and no aromatic rings,
a $C_5$-olefin, and
a debutanized aromatic concentrate; and
at least one member selected from the group consisting of: a fatty acid-containing material and a rosin acid-containing material.

2. The method of claim 1, wherein the at least one ethylenically unsaturated lower aliphatic dicarboxylic acid or anhydride comprises maleic acid or maleic anhydride.

3. The method of claim 1, wherein the reaction mixture comprises the dimer of the aliphatic cyclic diene having five carbon atoms, the dimer of the aliphatic non-cyclic diene having five carbon atoms, or both.

4. The method of claim 1, wherein the reaction mixture further comprises the monoolefin, the diolefin, or the polyene.

5. The method of claim 1, wherein the reaction mixture further comprises the $C_5$-olefin.

6. The method of claim 1, wherein the reaction mixture further comprises the debutanized aromatic concentrate.

7. The method of claim 1, wherein the drilling fluid mixture has a high temperature high pressure fluid loss at 250° F. of about 3 mL to about 7 mL, as measured by the API Recommended Practice Standard 13B-2, Third Edition, February 1998.

8. The method of claim 1, wherein the drilling fluid mixture has a high temperature high pressure fluid loss at 250° F. of 0 to about 1 mL, as measured by the API Recommended Practice Standard 13B-2, Third Edition, February 1998.

9. A method for making a drilling fluid mixture, comprising:
combining an oil-based drilling fluid and a reaction product of at least one ethylenically unsaturated lower aliphatic dicarboxylic acid or anhydride and a hydrocarbon resin to produce a a drilling fluid mixture, wherein the drilling fluid mixture is an emulsion, a suspension, or a dispersion, and wherein the hydrocarbon resin comprises a polymerized product of a reaction mixture comprising:
a first component comprising dicyclopentadiene;
a second component selected from the group consisting of:
a dimer of an aliphatic cyclic diene having five carbon atoms,
a dimer of an aliphatic non-cyclic diene having five carbon atoms,
a monoolefin, a diolefin, or a polyene, each having more than five carbon atoms and no aromatic rings,
a $C_5$-olefin, and
a debutanized aromatic concentrate; and
a third component selected from the group consisting of: a fatty acid-containing material and a rosin acid-containing material.

10. The method of claim 9, wherein the reaction mixture comprises greater than 35 wt % to about 85 wt % of the dicyclopentadiene, based on a combined weight of the first component, the second component, and the third component.

11. The method of claim 9, wherein the reaction mixture comprises greater than 35 wt % to about 85 wt % of the dicyclopentadiene, about 1 wt % to about 35 wt % of the second component, and about 1 wt % to about 35 wt % of the third component, based on a combined weight of the first component, the second component, and the third component.

12. The method of claim 9, wherein the at least one ethylenically unsaturated lower aliphatic dicarboxylic acid or anhydride comprises maleic acid or maleic anhydride.

13. The method of claim 9, wherein the reaction mixture comprises greater than 35 wt % to about 85 wt % of the dicyclopentadiene, about 5 wt % to about 35 wt % of the second component, and about 10 wt % to about 35 wt % of the third component, based on a combined weight of the first component, the second component, and the third component.

14. The method of claim 9, wherein:
the at least one ethylenically unsaturated lower aliphatic dicarboxylic acid or anhydride comprises maleic acid or maleic anhydride,
the reaction mixture comprises about 50 wt % to about 85 wt % of the dicyclopentadiene, about 5 wt % to about 35 wt % of the second component, and about 10 wt % to about 35 wt % of the third component, based on a combined weight of the first component, the second component, and the third component, and
the reaction product is produced by reacting a mixture comprising about 1 wt % to about 10 wt % of the ethylenically unsaturated lower aliphatic dicarboxylic acid or anhydride, based on a combined weight of the ethylenically unsaturated lower aliphatic dicarboxylic acid or anhydride and the hydrocarbon resin.

15. The method of claim 1, wherein the oil-based drilling fluid comprises an oleaginous fluid, a non-oleaginous fluid, an emulsifier, and an additive, and wherein the drilling fluid mixture is an invert emulsion.

16. The method of claim 1, wherein the oil-based drilling fluid comprises an oleaginous fluid, a non-oleaginous fluid, an emulsifier, and an additive, and wherein the drilling fluid mixture comprises about 0.05 wt % to about 9 wt % of the reaction product of the at least one ethylenically unsaturated lower aliphatic dicarboxylic acid or anhydride and the hydrocarbon resin, based on a combined weight of the oleaginous fluid, the non-oleaginous fluid, the emulsifier, and the additive.

17. The method of claim 16, wherein:
the oleaginous fluid comprises a diesel oil, a mineral oil, a hydrogenated olefin, a non-hydrogenated olefin, or a mixture thereof,
the non-oleaginous fluid comprises water,
the emulsifier comprises a fatty acid, a soap of a fatty acid, an amidoamine, a polyamide, a polyamine, an oleate ester, an imidazoline, or a mixture thereof,
the additive comprises a viscosifier, a suspending agent, a weighting agent, an acid, a base, or a mixture thereof, and
the at least one ethylenically unsaturated lower aliphatic dicarboxylic acid or anhydride comprises maleic acid, methyltetrahydrophthalic acid, fumaric acid, glutaconic acid, citraconic acid, mesaconic acid, tetrahydrophthalic acid, methyltetrahydrophthalic acid, itaconic acid, glutaconic acid, maleic anhydride, tetrahydrophthalic anhydride, glutaconic anhydride, itaconic anhydride, citraconic anhydride, or methyltetrahydrophthalic anhydride.

* * * * *